(12) United States Patent
Seki et al.

(10) Patent No.: US 12,147,169 B2
(45) Date of Patent: Nov. 19, 2024

(54) IMAGE FORMING APPARATUS AND EXPOSURE APPARATUS FOR FORMING IMAGE USING ROD LENS ARRAY

(71) Applicant: CANON KABUSHIKI KAISHA, Tokyo (JP)

(72) Inventors: Hirotaka Seki, Tokyo (JP); Koichiro Nakanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 18/168,076

(22) Filed: Feb. 13, 2023

(65) Prior Publication Data
US 2023/0273544 A1 Aug. 31, 2023

(30) Foreign Application Priority Data

Feb. 25, 2022 (JP) ................................. 2022-028384
Aug. 31, 2022 (JP) ................................. 2022-138340
Jan. 27, 2023 (JP) ................................. 2023-011220

(51) Int. Cl.
*G03G 15/04* (2006.01)
*B41J 2/00* (2006.01)
(Continued)

(52) U.S. Cl.
CPC .......... *G03G 15/043* (2013.01); *B41J 2/4473* (2013.01); *B41J 2/45* (2013.01); *G02B 27/0025* (2013.01); *G02B 27/0031* (2013.01); *G03G 15/04054* (2013.01); *G03G 15/04063* (2013.01); *G06K 15/1261* (2013.01); *G03G 2215/0409* (2013.01); *G03G 2215/0412* (2013.01)

(58) Field of Classification Search
CPC ........... G03G 15/043; G03G 15/04054; G03G 15/04063; G03G 2215/0407; G03G 2215/0409; G03G 2215/0412; G06K 15/1247; G06K 15/1261; G02B 27/0025; G02B 27/0031; B41J 2/4473; B41J 2/45
USPC ........... 399/51; 347/130, 131, 252, 253, 254
See application file for complete search history.

(56) References Cited

U.S. PATENT DOCUMENTS

| 7,391,430 B2 | 6/2008 | Mitani |
| 2004/0114026 A1* | 6/2004 | Kondo ............... G06K 15/1247 347/238 |

(Continued)

FOREIGN PATENT DOCUMENTS

| JP | 2005-170033 A | 6/2005 |
| JP | 2008-275692 A | 11/2008 |

(Continued)

*Primary Examiner* — Robert B Beatty
(74) *Attorney, Agent, or Firm* — Venable LLP

(57) ABSTRACT

An exposure apparatus comprises an exposure head, a memory and at least one processor. The exposure head includes light-emitting elements, and a rod lens array. A photosensitive body is rotationally driven. The light-emitting elements are arranged in a direction intersecting a direction of rotation of the photosensitive body. The rod lens array forms an image of light on the photosensitive body. The light is outputted from any of the light-emitting elements based on image data, passes through the rod lens array and reaches the photosensitive body. The memory stores correction data for correcting a streak image. The at least one processor corrects the image data based on the correction data read out from the memory.

17 Claims, 28 Drawing Sheets

(51) Int. Cl.
  *B41J 2/447*   (2006.01)
  *B41J 2/45*    (2006.01)
  *G02B 27/00*   (2006.01)
  *G03G 15/043*  (2006.01)
  *G06K 15/00*   (2006.01)
  *G06K 15/12*   (2006.01)

(56) References Cited

U.S. PATENT DOCUMENTS

| | | |
|---|---|---|
| 2005/0128538 A1 | 6/2005 | Mitani |
| 2007/0070166 A1* | 3/2007 | Mikami ............... B41J 2/45 347/130 |
| 2010/0195460 A1* | 8/2010 | Hasebe ............... B41J 2/451 |
| 2015/0261117 A1 | 9/2015 | Suzuki |
| 2020/0073276 A1* | 3/2020 | Shindo ............ G03G 15/04018 |
| 2021/0055669 A1 | 2/2021 | Yoshida |
| 2021/0303844 A1 | 9/2021 | Goda |
| 2022/0011705 A1* | 1/2022 | Shirasaki ............... G03G 15/80 |
| 2022/0266604 A1* | 8/2022 | Tanimoto ........... H04N 1/00885 |
| 2023/0130313 A1* | 4/2023 | Kuo .................... B41J 2/47 347/247 |
| 2023/0305420 A1 | 9/2023 | Goda |

FOREIGN PATENT DOCUMENTS

| | | |
|---|---|---|
| JP | 4531491 B2 | 8/2010 |
| JP | 2015-112856 A | 6/2015 |

* cited by examiner

FIG. 2A
FIG. 2B
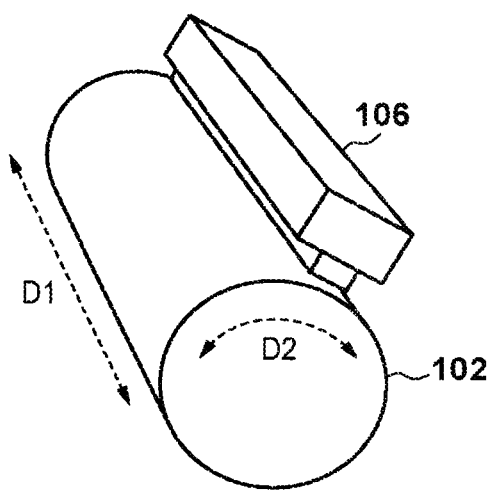
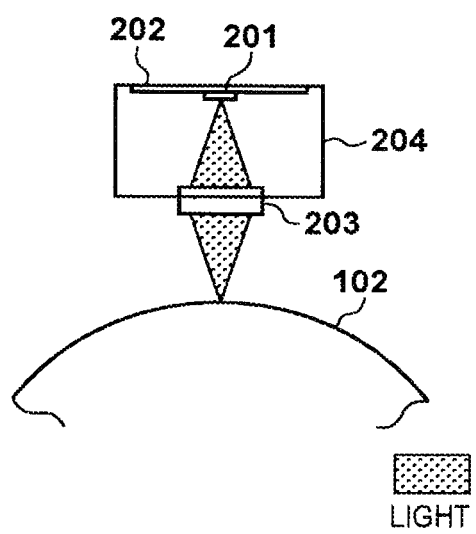

FIG. 3A
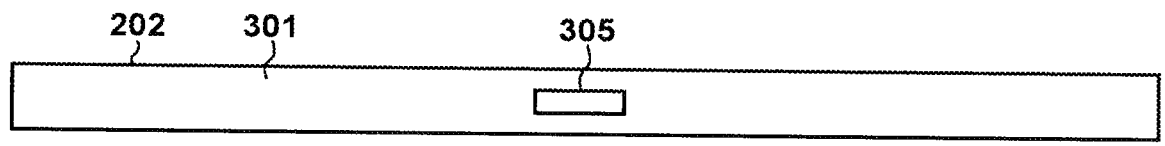
FIG. 3B
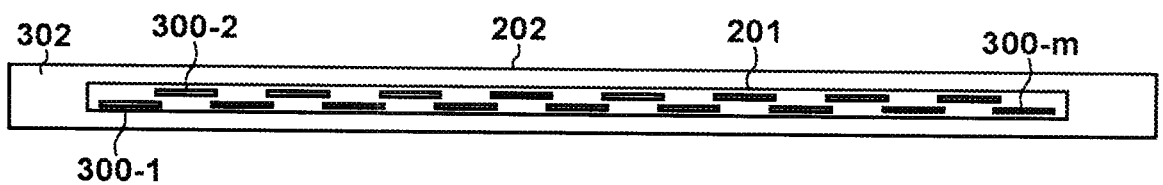
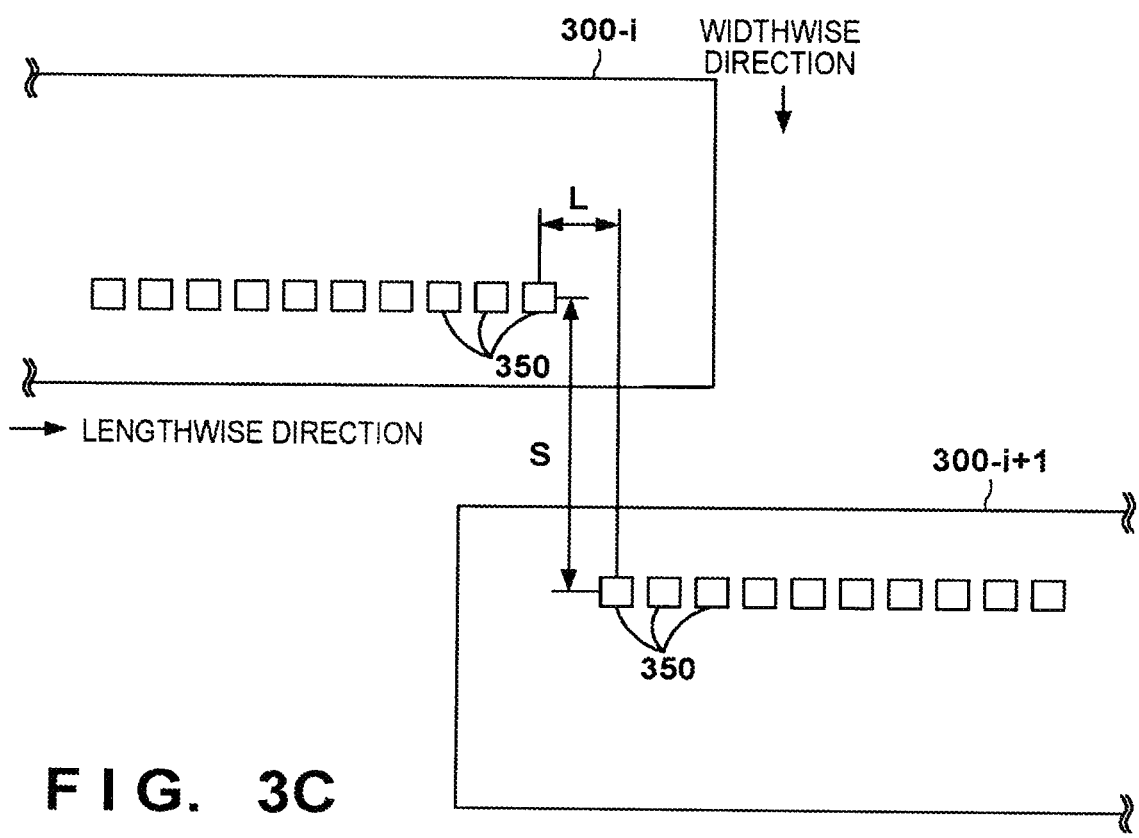
FIG. 3C

FIG. 13

| STREAK NUMBER | STREAK START POSITION | STREAK RANK |
|---|---|---|
| 1 | 100 | 3,3,4,4,4,5,5,5,6,5,5,4,4,3,3,2 |
| 2 | 1000 | 1,1,2,3,4,5,5,5,5,5,5,5,3,2,1,1 |
| 3 | 3000 | 2,2,3,3,4,4,5,5,6,6,7,7,6,6,5,5 |
| 4 | 6000 | 2,3,4,5,6,7,8,9,10,10,10,9,8,7,6,5 |
| 5 | 10000 | 0,0,1,1,2,2,2,3,4,4,4,3,3,3,0,0 |

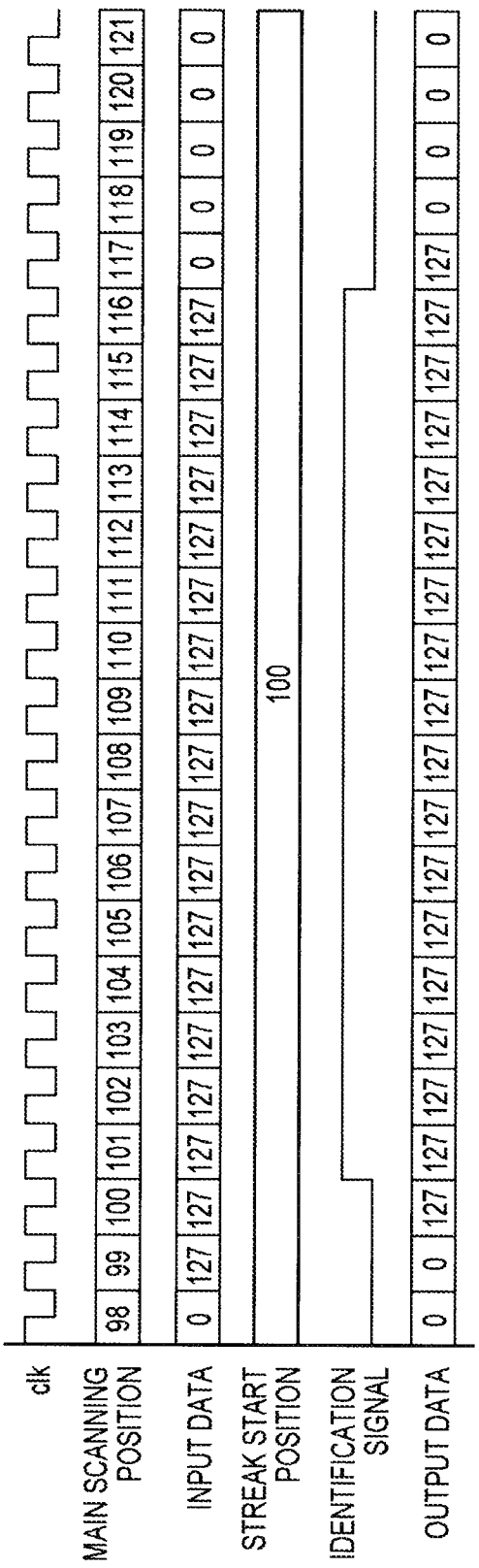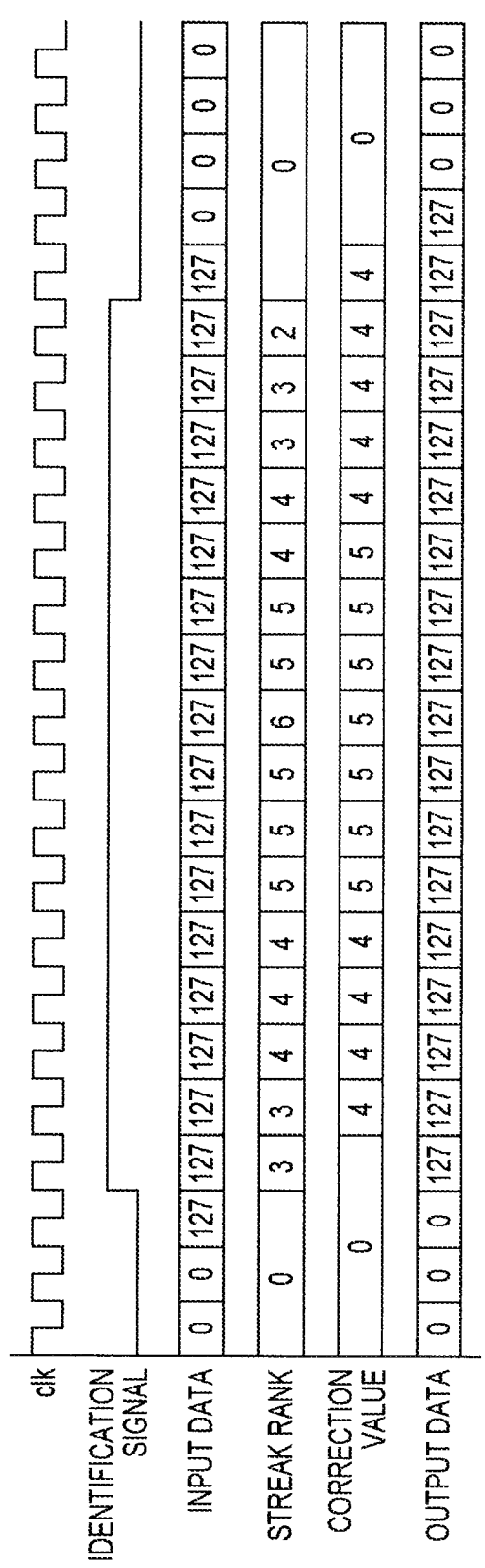

FIG. 17

| IMAGE DATA | STREAK RANK | CORRECTION VALUE |
|---|---|---|
| 0 | 0 | 0 |
| | 1 | 0 |
| | 2 | 0 |
| | 3 | 0 |
| | 4 | 1 |
| | 5 | 1 |
| | 6 | 1 |
| | 7 | 1 |
| | 8 | 2 |
| | 9 | 2 |
| | 10 | 2 |
| | 11 | 2 |
| | 12 | 3 |
| | 13 | 3 |
| | 14 | 3 |
| | 15 | 3 |
| ... | ... | ... |
| 255 | 0 | 0 |
| | 1 | 0 |
| | 2 | 0 |
| | 3 | 0 |
| | 4 | -1 |
| | 5 | -1 |
| | 6 | -1 |
| | 7 | -1 |
| | 8 | -2 |
| | 9 | -2 |
| | 10 | -2 |
| | 11 | -2 |
| | 12 | -3 |
| | 13 | -3 |
| | 14 | -3 |
| | 15 | -3 |

IMAGE FORMING APPARATUS AND EXPOSURE APPARATUS FOR FORMING IMAGE USING ROD LENS ARRAY

BACKGROUND OF THE INVENTION

Field of the Invention

The present disclosure relates to an image forming apparatus and an exposure apparatus for forming an image using a rod lens array.

Description of the Related Art

Electrophotographic image forming apparatuses that form a latent image by exposing a photosensitive drum using an exposure head comprising light-emitting diodes (LEDs), organic electroluminescence (EL), or the like are known. Each of a plurality of light-emitting elements is provided with a rod lens, and light outputted from a light-emitting element is focused by the rod lens to form a spot of a predetermined size on a photosensitive body. A plurality of rod lenses are arranged in a row to form a rod lens array. Incidentally, when any of the rod lenses in the rod lens array is arranged to be askew, the amount of light becomes uneven. As a result, a white or black streak occurs on an image formed on a sheet. Japanese Patent Laid-Open No. 2008-275692 describes determining whether rod lenses are non-defective based on a distribution of intensity of light transmitted through a rod lens array.

Conventionally, defective rod lens arrays have been discarded. As a result, a yield of rod lens arrays has decreased, thereby increasing the cost of image forming apparatuses in which a rod lens array is mounted.

SUMMARY OF THE INVENTION

The present disclosure provides an exposure apparatus comprising: an exposure head including a plurality of light-emitting elements arranged in a direction intersecting a direction of rotation of a photosensitive body to be rotationally driven, and a rod lens array configured to form an image of light outputted from each of the plurality of light-emitting elements based on image data, on the photosensitive body, and configured to form a latent image on the photosensitive body a memory configured to store correction data for correcting a streak image; and at least one processor configured to correct the image data based on the correction data read out from the memory.

Further features of the present disclosure will become apparent from the following description of exemplary embodiments (with reference to the attached drawings).

BRIEF DESCRIPTION OF THE DRAWINGS

FIGS. 2A and 2B are diagrams for explaining an arrangement of a photosensitive drum and an exposure head.

FIGS. 3A to 3C are diagrams for explaining a printed circuit board.

FIG. 13 is a diagram for explaining streak information.

FIGS. 16A to 16C are timing charts illustrating operation of the streak correction unit.

FIG. 17 is a diagram for explaining correction values corresponding to combinations of a streak rank and image data.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

<Image Forming Apparatus>

Figure 1:
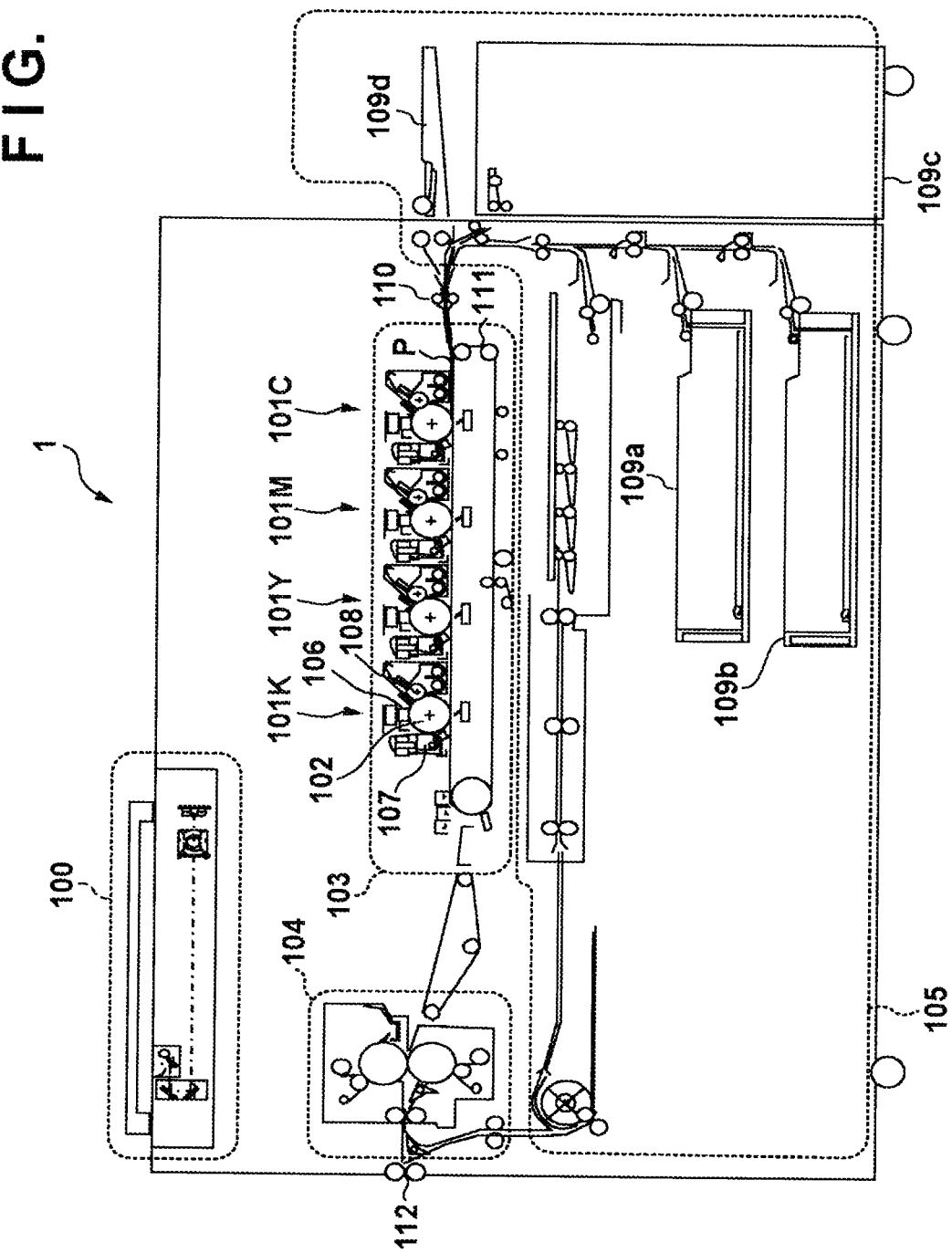
FIG. 1 is a diagram for explaining an image forming apparatus.

FIG. 1 illustrates an image forming apparatus 1, which is an electrophotographic copy machine. However, the image forming apparatus 1 may be realized as a monochrome printer, full-color printer, facsimile communication apparatus, or multifunction peripheral.

A scanner unit 100 is a document reading apparatus for creating image data by optically reading a document image by applying illumination light to a document placed on a document table and converting the reading result into an electric signal. A printer engine 103 forms a toner image on a sheet P. The printer engine 103 rotates a photosensitive drum 102. A charger 107 charges a surface of the photosensitive drum 102 so as to make a potential on the surface of the photosensitive drum 102 uniform. An exposure head 106 forms an electrostatic latent image on the surface of the photosensitive drum 102 by exposing the surface of the photosensitive drum 102 with light corresponding to image data. A developer 108 forms a toner image by attaching toner to the electrostatic latent image formed on the photosensitive drum 102. The toner image arrives at a transfer nip by the photosensitive drum 102 further rotating. At the transfer nip, the sheet P is conveyed while being held between the photosensitive drum 102 and a transfer belt 111. The toner image is thus transferred from the photosensitive drum 102 to the sheet P.

The printer engine 103 includes four image forming units 101C, 101M, 101Y, and 101K corresponding to cyan, magenta, yellow, and black (CMYK), which are toner colors, respectively. A full-color image is formed on the sheet P by the four image forming units 101C, 101M, 101Y, and 101K transferring toner images, each of a different color, to the sheet P.

A feeding unit 105 feeds the sheet P from a pre-designated feeding apparatus among feeding apparatuses 109a and 109b provided in a main body of the image forming apparatus 1, a feeding apparatus 109c provided outside the main body, and a manual feeding apparatus 109d. The fed sheet P is conveyed to a registration roller 110. The registration roller 110 conveys the sheet P so that a timing at which a toner image arrives at a transfer nip and a timing at which the sheet P arrives at that transfer nip coincide. The transfer belt 111 conveys to a fixer 104 the sheet P to which the toner images have been transferred.

The fixer 104 fixes the toner images onto the sheet P by applying pressure and heat to the toner images and the sheet P. A sheet discharge roller 112 discharges the sheet P out of the image forming apparatus 1.

<Exposure Head>

FIG. 2A is a perspective view of the exposure head 106 for exposing the photosensitive drum 102. FIG. 2B is a schematic cross-sectional view of the photosensitive drum 102 and the exposure head 106. The exposure head 106 includes a light-emitting element group 201, a printed circuit board 202, a rod lens array 203, and a housing 204. Light outputted from the light-emitting element group 201 mounted on the printed circuit board 202 is focused by the rod lens array 203 and irradiated onto the surface of the photosensitive drum 102. The printed circuit board 202 and the rod lens array 203 are fixed with respect to the housing 204.

The exposure head 106 is arranged such that its lengthwise direction is parallel to an axial direction D1 of the photosensitive drum 102 and a surface on which the rod lens array 203 is mounted faces the surface of the photosensitive drum 102. The light-emitting element group 201 includes a plurality of light-emitting elements arranged periodically at least in parallel to the axial direction D1. While the photosensitive drum 102 is rotating in a circumferential direction D2, the light-emitting element group 201 of the exposure head 106 emits light and the rod lens array 203 causes that light to be formed into an image on the surface of the photosensitive drum 102. In the present specification, a direction parallel to the axial direction D1 of the photosensitive drum 102 is referred to as a first direction, and a direction perpendicular to the first direction (substantially parallel to the circumferential direction D2) on a surface of the printed circuit board 202 is referred to as a second direction.

Assembly and adjustment work are performed individually for the exposure head 106. Adjustment work includes adjustment of a size of a spot at a focal position (focus adjustment) and adjustment of the amount of light. In focus adjustment, a mounting position of the rod lens array 203 is adjusted such that a distance between the rod lens array 203 and the light-emitting element group 201 is a predetermined value. In adjustment of the amount of light, a driving current of each light-emitting element is adjusted such that the amount of light focused through the rod lens array 203 is a predetermined amount of light by causing a plurality of light-emitting elements included in the light-emitting element group 201 to sequentially emit light one at a time.

<Configuration of Light-Emitting Element Group>

FIG. 3A illustrates a non-mounting surface 301 of the printed circuit board 202. Although light-emitting elements are not mounted, other electronic components, such as a connector 305 are mounted on the non-mounting surface 301. A cable (power supply line and signal line) for carrying various signals, such as a clock signal, to the printed circuit board 202 is connected to the connector 305.

As illustrated in FIG. 3B, the light-emitting element group 201 is mounted on a mounting surface 302 of the printed circuit board 202. The mounting surface 302 is a surface opposite to the non-mounting surface 301. The light-emitting element group 201 includes m light-emitting element arrays 300-1 to 300-m arranged in a staggered manner. In the following, a case where m=20 will be explained as an example. The light-emitting element arrays may also be called light-emitting chips. The light-emitting element arrays 300-1 to 300-m may be collectively referred to as light-emitting element arrays 300.

As illustrated in FIG. 3C, a plurality of light-emitting elements 350 are arranged along a lengthwise direction of the light-emitting element arrays 300 in each of the light-emitting element arrays 300-1 to 300-m.

As illustrated in FIG. 3B, the light-emitting element arrays 300 are arranged in two rows. In a first row, the light-emitting element array 300-1, the light-emitting element array 300-3, . . . , and a light-emitting element array 300-m−1 are provided. In a second row, the light-emitting element array 300-2, the light-emitting element array 300-4, . . . , and a light-emitting element array 300-m are provided.

As illustrated in FIG. 3C, a distance between two adjacent light-emitting elements 350 in a given light-emitting element array 300 is L. The distance L is a distance in the lengthwise direction of the light-emitting element arrays 300. At a resolution of 1200 dpi, L=approximately 21.16 µm. This is a distance equivalent to one pixel at 1200 dpi. A distance between a rightmost light-emitting element 350 of an i-th light-emitting element array 300-i and a leftmost light-emitting element 350 of an i+1-th light-emitting element array 300-i+1 is also L. i is any integer from 1 to m−1. As illustrated in FIG. 3C, in a widthwise direction of the light-emitting element arrays 300, a distance S between the rightmost light-emitting element 350 of the light-emitting element array 300-i and the leftmost light-emitting element 350 of the light-emitting element array 300-i+1 is approximately 105 μm. This is a distance equivalent to five pixels at 1200 dpi. The distances L and S are only one example.

<Configuration of Light-Emitting Element Array>

Figure 4:
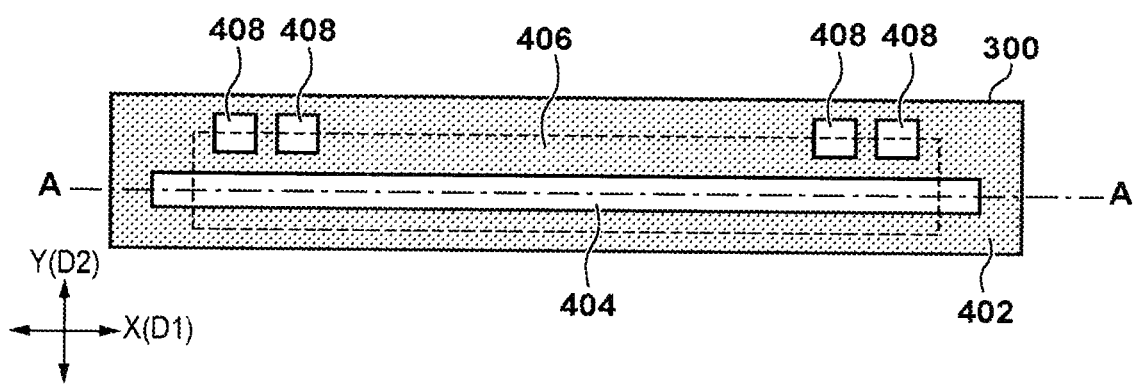
FIG. 4 is a diagram for explaining a light-emitting element array.

FIG. 4 is a plan view of a light-emitting element array 300. An X direction represents the lengthwise direction of the photosensitive drum 102. A Y direction represents a direction of rotation of the photosensitive drum 102. The light-emitting element array 300 includes a light emission substrate 402, a light-emitting unit 404 including a plurality of light-emitting elements 350 mounted on the light emission substrate 402, and WB pads 408 mounted on the light emission substrate 402. WB is an abbreviation for wire bonding. A circuit unit 406 for controlling the light-emitting unit 404 is incorporated in the light emission substrate 402. The circuit unit 406 includes both an analog driving circuit (analog part) and a digital control circuit (digital part). A power supply to the circuit unit 406 and signal input and output to and from the light-emitting element array 300 are performed via WB pads 408.

<Light-Emitting Unit>

Figure 5:
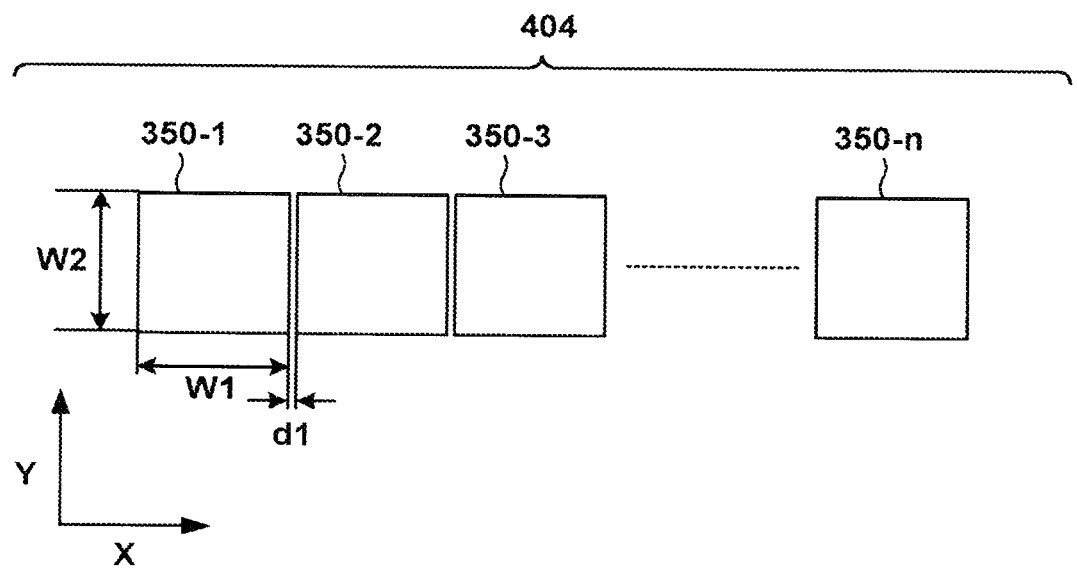
FIG. 5 is a diagram for explaining an arrangement of light-emitting elements.

FIG. 5 illustrates a row of light-emitting elements constituting the light-emitting unit 404. The light-emitting unit 404 includes n light-emitting elements 350 arranged in a row. Each of the plurality of light-emitting elements 350 is arranged at a predetermined pitch (distance L=21.16 μm) in an X direction.

In FIG. 5, W1 is a length of a light-emitting element 350 in the X direction. d1 is a bordering space between two adjacent light-emitting elements 350 in the X direction. W2 is a length of a light-emitting element 350 in the Y direction. The length W2 is determined in consideration of a scan rate and resolution in the Y direction. In one example, the lengths W1 and W2 are 20.9 μm and the bordering space d1 is 0.26 μm.

<Control Block>

Figure 6:
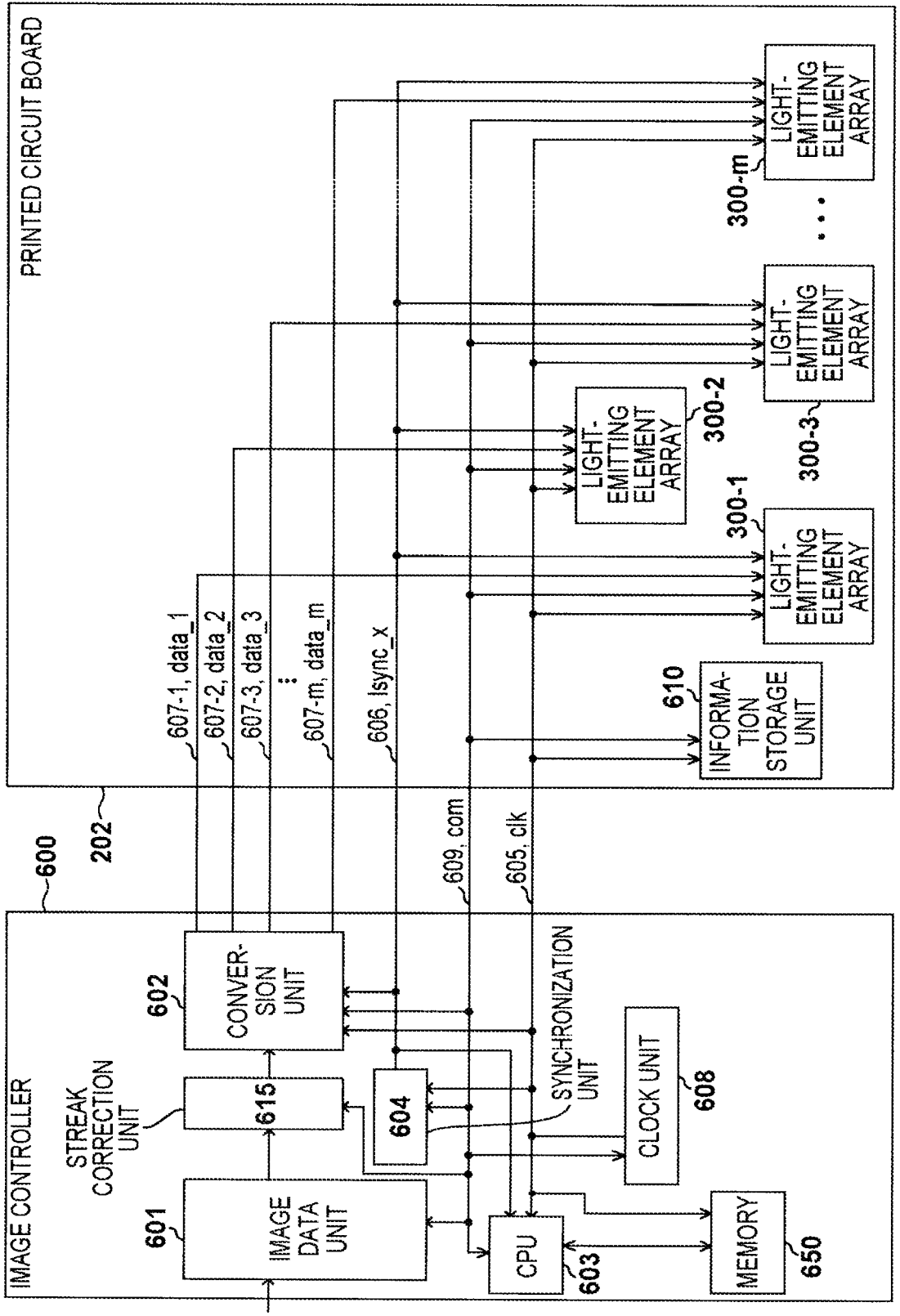
FIG. 6 is a block diagram illustrating an image controller and the printed circuit board.

FIG. 6 illustrates a block diagram of an image controller 600 and the printed circuit board 202. In the present embodiment, for descriptive simplicity, a circuit configuration and processing for a single color, K of YMCK, will be described. Similar processing and circuit configuration are also employed for YMC.

The image controller 600 is a control circuit for generating and transmitting a signal group for controlling the printed circuit board 202 to the printed circuit board 202. Such a signal group includes a clock signal clk, image data data_1 to data_m, a line synchronization signal lsync_x, and a communication signal com. The clock signal clk is a signal that is generated by a clock unit 608 and serves as a reference for operation in various circuits. The image data data_1 to data_m is image data supplied to the light-emitting element arrays 300-1 to 300-m, respectively. The line synchronization signal lsync_x represents a write start timing of an image in a sub-scanning direction. The communication signal com is a communication signal that is transmitted or received between a CPU 603 and the printed circuit board 202. The clock signal clk is transmitted from the clock unit 608 to the printed circuit board 202 and the like via a clock signal line 605. The line synchronization signal lsync_x is transmitted from a synchronization unit 604 to the printed circuit board 202 and the like via a synchronization signal line 606. The image data data_1 to data_m is transmitted to the light-emitting element arrays 300-1 to 300-m via image signal lines 607-1 to 607-m, respectively. The communication signal com is transmitted from the CPU 603 to an information storage unit 610 and the light-emitting element arrays 300-1 to 300-m via a communication signal line 609.

An image data unit 601 subjects image data received from the scanner unit 100 or a computer external to the image forming apparatus 1 to image processing and outputs the image data to a streak correction unit 615. The image processing includes, for example, dithering processing to be performed at a resolution instructed by the CPU 603. For example, dithering processing is performed at a resolution of 2400 dpi in the sub-scanning direction and a resolution of 1200 dpi in a main scanning direction. The image data is 8 bits wide and represents, for example, the amount of light to be lit.

The streak correction unit 615 corrects the image data inputted from the image data unit 601 based on streak information stored in the information storage unit 610 in an assembly process of the exposure head 106 and outputs the corrected image data to a conversion unit 602. As described above, streak-like density unevenness (a streak image) may occur due to tilting of the rod lens array 203. Streak images are reproducible. Therefore, in the assembly process of the exposure head 106, a main scanning position at which density becomes uneven is detected, a correction value of image data at that position is measured, and the main scanning position at which correction is to be performed and the correction value are written in the information storage unit 610 as streak information. Thus, streak images attributable to tilting of the rod lens array 203 are less likely to occur.

The clock unit 608 is an oscillation circuit for generating a fixed periodic clock signal clk. The clock signal clk is supplied to the CPU 603, the synchronization unit 604, the conversion unit 602, and the printed circuit board 202. The CPU 603 executes the following processing according to a control program stored in a ROM region of a memory 650. The memory 650 also includes a RAM region for holding variables and the like.

The CPU 603 determines a frequency at which the line synchronization signal lsync_x is to be generated. The frequency of generation is calculated based on, for example, a speed of rotation of the photosensitive drum 102 (information on a speed at which the surface of the photosensitive drum 102 moves in a direction of rotation) and a magnification in the sub-scanning direction of an image. The CPU 603 sets in the synchronization unit 604 the frequency at which the line synchronization signal lsync_x is to be generated. Further, the CPU 603 receives the line synchronization signal lsync_x from the synchronization unit 604 and identifies a timing at which the generation of the line synchronization signal lsync_x has been completed.

The conversion unit 602 generates the image data data_1 to data_m by dividing one line of image data outputted from the image data unit 601 via the streak correction unit 615 into m pieces. The conversion unit 602 transmits the image data data_1 to data_m to the printed circuit board 202 in synchronization with the line synchronization signal lsync_x and the clock signal clk.

The synchronization unit 604 generates the line synchronization signal lsync_x at the frequency of generation instructed by the CPU 603. The line synchronization signal lsync_x is supplied to the printed circuit board 202, the conversion unit 602, and the CPU 603.

In the printed circuit board 202, the light-emitting element array 300-*i* is operated by being supplied with the line synchronization signal lsync_x, the clock signal clk, image data data_i, and the communication signal com. The information storage unit 610 is a storage circuit for storing head information. The head information includes the respective amounts of light emission of the light-emitting element arrays 300-1 to 300-*m*, positional information indicating mounting positions of the light-emitting element arrays 300-1 to 300-*m*, and the like. The CPU 603 accesses the information storage unit 610 via the communication signal line 609 to read out the head information and write setting information. The information storage unit 610 may store a driving current setting value that has been adjusted in the assembly process of the exposure head 106.

As illustrated in FIG. 6, the clock signal line 605, the communication signal line 609, and the synchronization signal line 606 are connected to all of the light-emitting element arrays 300. The image signal lines 607 and the light-emitting element arrays 300 are connected in a one-to-one manner. That is, one image signal line 607 is connected to one light-emitting element array 300.

<Configuration of Circuit Unit>

Figure 7:
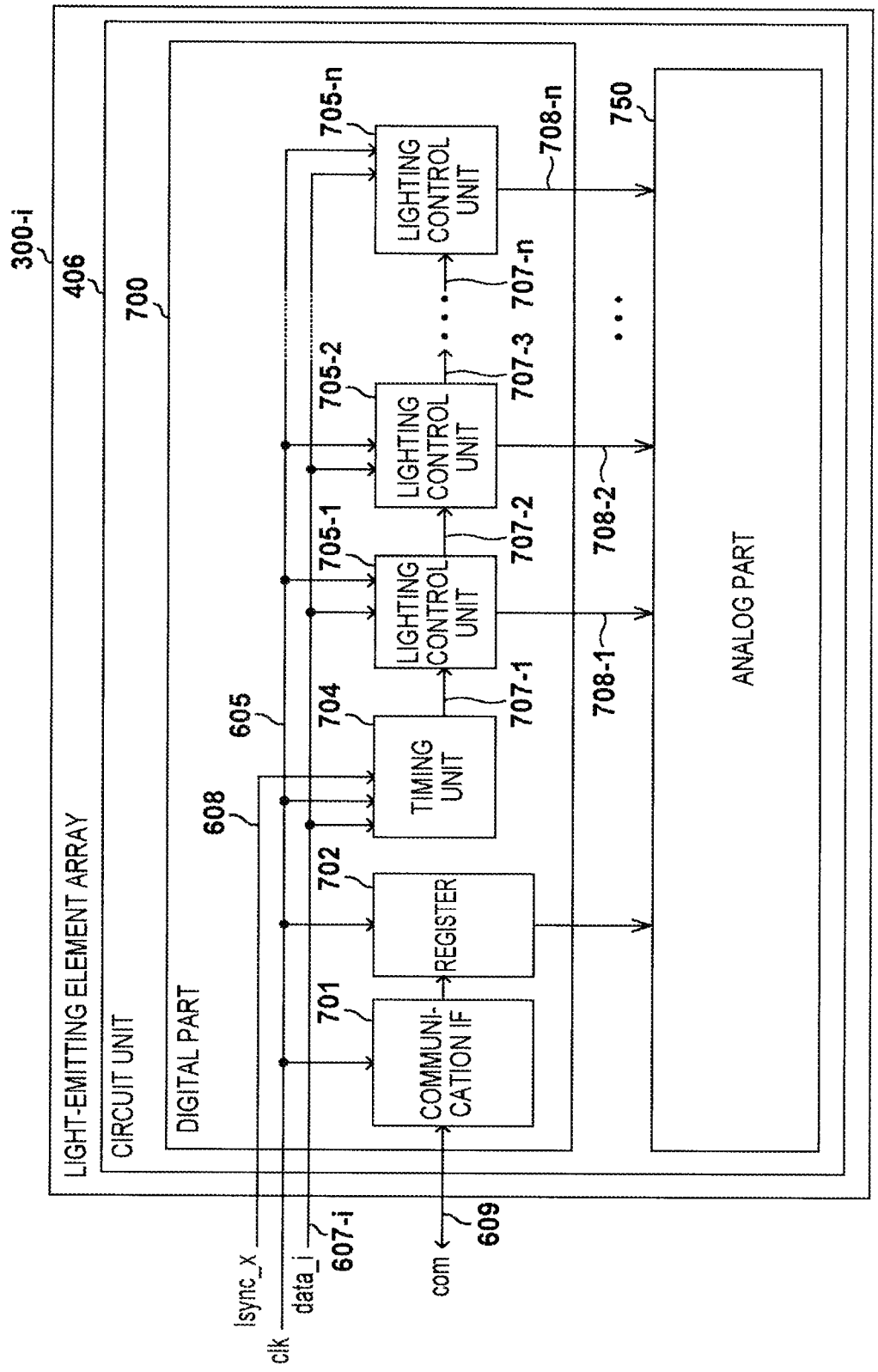
FIG. 7 is a block diagram illustrating a digital part.

FIG. 7 is a block diagram of the circuit unit 406 in the i-th light-emitting element array 300-*i*. i is an integer from 1 to m. The circuit unit 406 includes a digital part 700 and an analog part 750. The digital part 700 generates lighting signals for causing the light-emitting elements 350 to emit light based on setting values set in advance by the communication signal com, the line synchronization signal lsync_x, and the image data data_i in synchronization with the clock signal clk. The digital part 700 outputs the lighting signals to the analog part 750 via lighting signal lines 708.

A communication IF 701 controls writing and reading of setting values to a register 702 based on the communication signal com from the CPU 603. The register 702 holds setting values necessary for operation of the light-emitting elements 350. The setting values include a value indicating a driving current to be set in the analog part 750.

A timing unit 704 generates a timing signal based on the line synchronization signal lsync_x and supplies the timing signal to a lighting control unit 705-1 via a signal line 707-1. The lighting control unit 705-1 obtains the image data data_i from the image signal line 607 in accordance with the timing signal. The number n of the lighting control units 705 and the number n of the light-emitting elements 350 coincide. That is, one lighting control unit 705 is provided per light-emitting element 350. A lighting control unit 705-*j* outputs a lighting signal to the analog part 750 via a lighting signal line 708-*j*. j is an integer from 1 to n. The lighting control unit 705-*j* generates a timing signal for a lighting control unit 705-*j*+1 based on the inputted timing signal and supplies the timing signal to the lighting control unit 705-*j*+1 via a signal line 707-*j*+1. As described above, although the lighting control unit 705-1 is supplied a timing signal directly from the timing unit 704, lighting control units 705-2 to 705-*n* are supplied a timing signal from preceding lighting control units 705-1 to 705-*n*–1, respectively.

The analog part 750 drives the light-emitting elements 350-1 to 350-*n* based on pulsed lighting signals generated by the digital part 700.

<Details of Timing Unit>

Figure 8A:
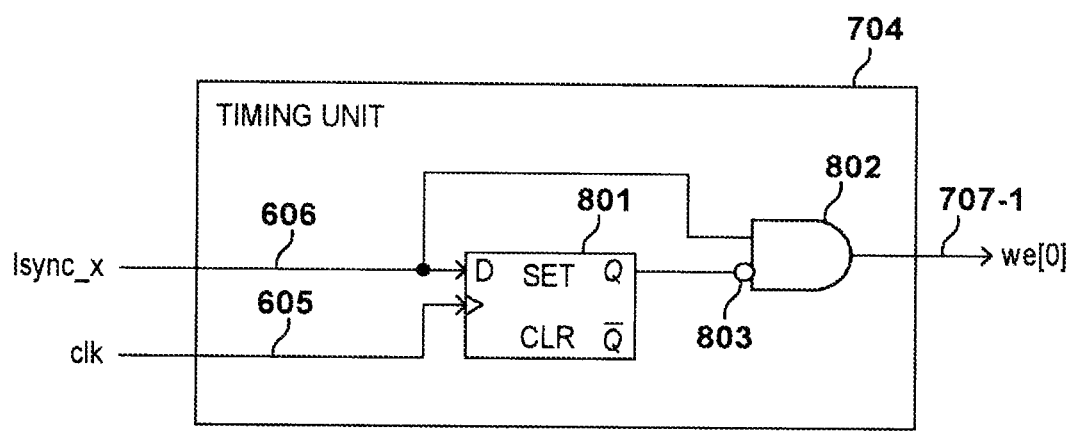
FIGS. 8A and 8B are diagrams for explaining a timing unit.

FIG. 8A is a circuit diagram of the timing unit 704. Here, it is assumed that the line synchronization signal lsync_x is a negative logic signal; however, the line synchronization signal lsync_x may also be a positive logic signal. we[0] is a timing signal. The timing unit 704 is a logic circuit for outputting a timing signal we[0] only when the line synchronization signal lsync_x changes from low to high.

The synchronization signal line 606 and the clock signal line 605 are connected to a delay circuit 801, which delays the line synchronization signal lsync_x transmitted by the synchronization signal line 606 by one cycle and outputs the line synchronization signal lsync_x to a logic gate 802. The delay circuit 801 is realized by, for example, a flip-flop circuit.

The logic gate 802 computes a logical product (AND) of a line synchronization signal lsync_x and a signal obtained by inverting the output signal of the delay circuit 801 by an inversion element 803 and generates a timing signal we[0]. The timing signal we[0] is outputted to the signal line 707-1.

Figure 8B:
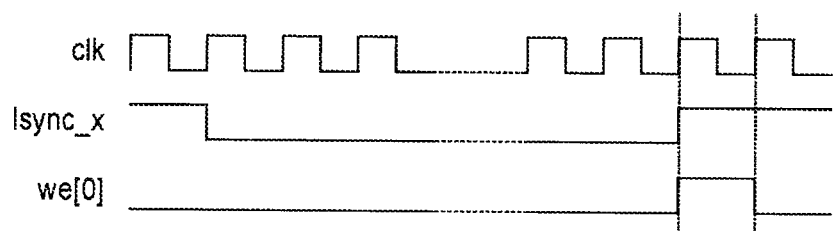

FIG. 8B is a timing chart of the timing unit 704. At a timing when the line synchronization signal lsync_x changes from low to high, the timing signal we[0] becomes high. The timing signal we[0] remains high for an amount of time corresponding to one cycle of the clock signal clk and then returns to low.

<Details of Lighting Control Unit>

Figure 9A:
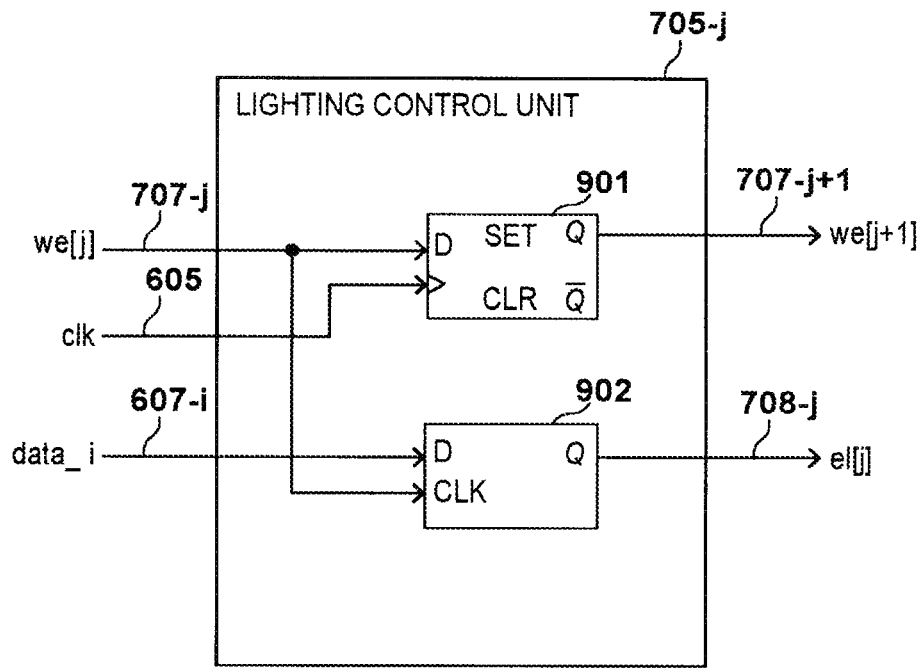
FIGS. 9A to 9C are diagrams for explaining a lighting control unit.

FIG. 9A is a circuit diagram of a j-th lighting control unit 705-*j* in the i-th light-emitting element array 300-*i*. j is an integer from 1 to n. A signal line 707-*j* and the clock signal line 605 are connected to a delay circuit 901. The delay circuit 901 delays a timing signal we[j] transmitted by the signal line 707-*j* by one cycle, generates a timing signal we[j+1] for the subsequent lighting control unit 705-*j*+1, and outputs the timing signal we[j+1] to the signal line 707-*j*+1. The delay circuit 901 need only be able to delay an input signal by an amount of time corresponding to one cycle of the clock signal clk and output the signal. For example, a flip-flop circuit may be employed as the delay circuit 901.

The signal line 707-*j* and an image signal line 607-*i* are connected to a latch circuit 902. The latch circuit 902 obtains the image data data_i during a period in which the timing signal we[j] is high and outputs a lighting signal el[j] to the lighting signal line 708-*j*. In the present embodiment, the latch circuit 902 is employed as a circuit for capturing the image data data_i; however, this is only one example. The circuit need only be able to hold the image data data_i until when the timing signal we[j] next becomes high from when the timing signal we[j] becomes high. For example, a flip-flop circuit may be employed in place of the latch circuit 902.

Figure 9B:
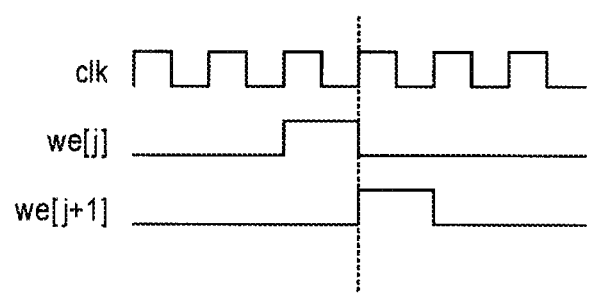

FIG. 9B is a timing chart of the delay circuit 901. The timing signal we[j+1] is generated by delaying the timing signal we[j] by one cycle of the clock signal clk.

Figure 9C:
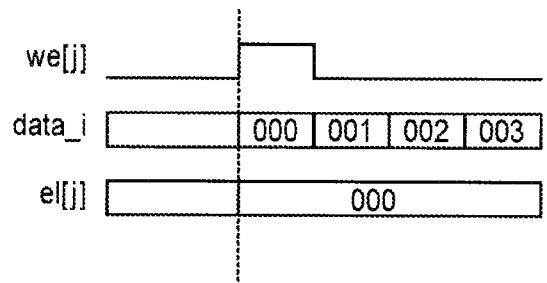

FIG. 9C is a timing chart of the latch circuit 902. The image data data_i ("000" in this example) is obtained during a period in which the timing signal we[j] is high, and the lighting signal el[j] is generated.

<Details of Analog Part>

Figure 10:
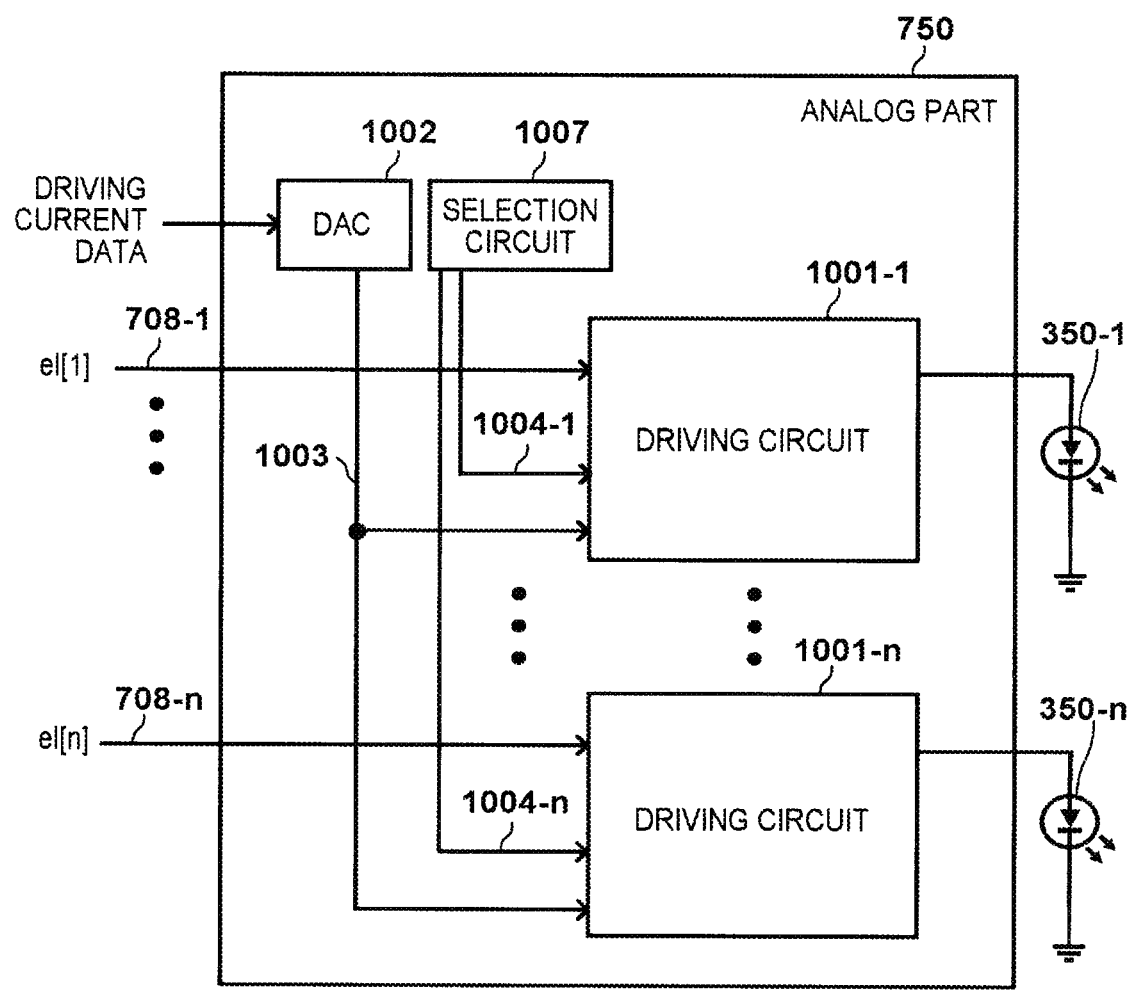
FIG. 10 is a block diagram illustrating an analog part.

FIG. 10 is a block diagram of the analog part 750. For descriptive simplicity, two light-emitting elements 350-1 and 350-*n* and two driving circuits 1001-1 and 1001-*n* are illustrated. In practice, there are n light-emitting elements 350-1 to 350-*n* and n driving circuits 1001-1 to 1001-*n*. Here, for generalization, a j-th light-emitting element 350-*j* and a j-th driving circuit 1001-*j* will be described. j is an integer from 1 to n.

The driving circuit 1001-*j* is a circuit for driving the j-th light-emitting element 350-*j*. The driving circuit 1001-*j* is supplied with the lighting signal el[j] via the lighting signal line 708-*j*.

A DAC 1002 converts driving current data set in the register 702 into an analog voltage and supplies the analog voltage to the driving circuits 1001-1 to 1001-n via a signal line 1003. DAC is an abbreviation for digital-to-analog converter. Here, the driving current data represents a setting value of a driving current supplied to the light-emitting elements 350-1 to 350-n.

A selection circuit 1007 generates a selection signal for selecting a driving circuit 1001 based on the data set in the register 702. The selection circuit 1007 supplies a selection signal to the driving circuits 1001-1 to 1001-n via signal lines 1004-1 to 1004-n. The selection signal is a signal by which only the signal line connected to one selected driving circuit 1001 among the n driving circuits 1001-1 to 1001-n becomes high. If the driving circuit 1001-1 is selected, only the signal line 1004-1 is controlled to be at a high level. The signal lines 1004-2 (not illustrated) to 1001-n are controlled to be at a low level. An analog voltage is set for each of the driving circuits 1001-1 to 1001-n via the signal line 1003 at the timing at which they are selected by the selection circuit 1007 (a timing at which the selection signal becomes high). The CPU 603 sequentially selects the driving circuits 1001-1 to 1001-n one at a time via the register 702 and sets an analog voltage corresponding to the selected driving circuit 1001. This makes it possible to set individual analog voltage to n driving circuits 1001-1 to 1001-n using a single DAC 1002. Each of the driving circuits 1001-1 to 1001-n thus takes input of the analog voltage, which determines the driving current, and the lighting signal and causes each of the corresponding light-emitting elements 350-1 to 350-n to emit light.

<Details of Driving Circuit>

Figure 11:
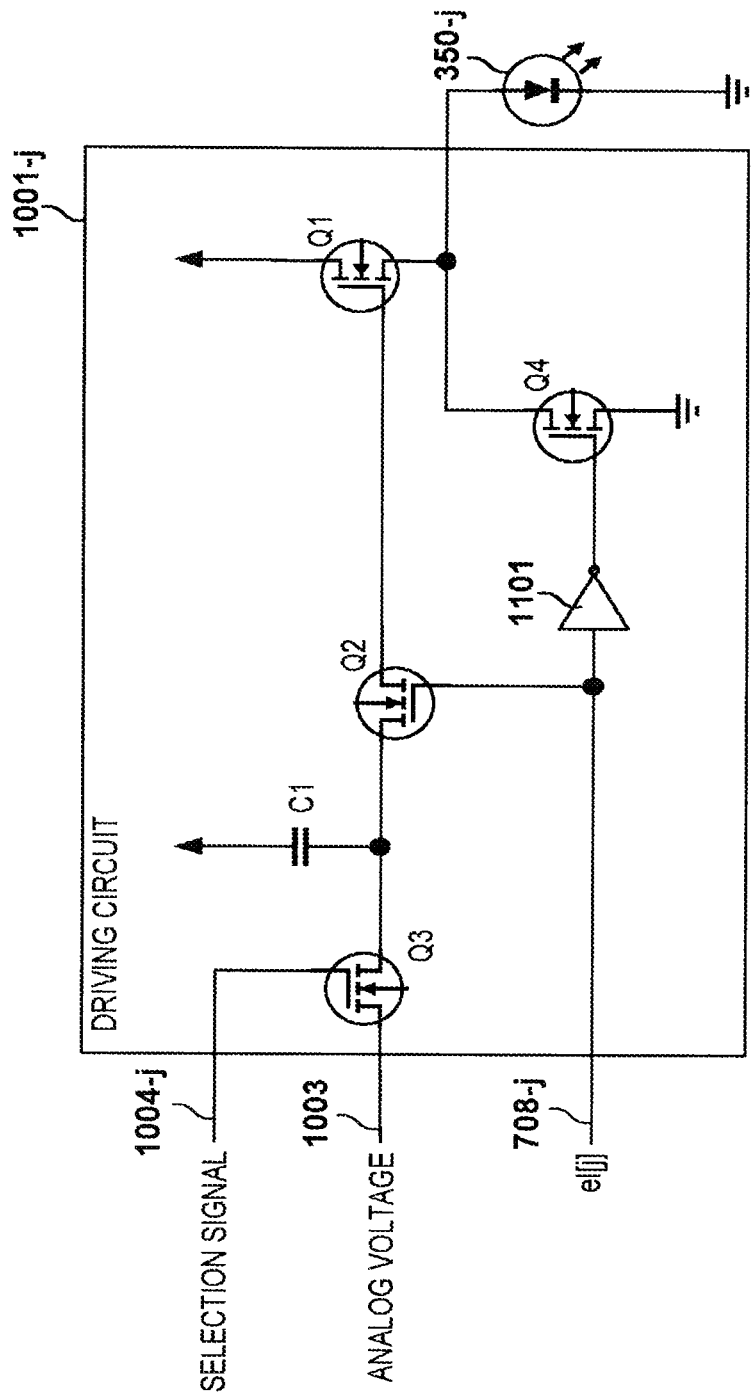
FIG. 11 is a diagram for explaining a driving circuit.

FIG. 11 is a circuit diagram of the j-th driving circuit 1001-j (j is an integer from 1 to n). The driving circuits 1001-1 to 1001-n all have the same circuit configuration.

A MOSFET Q1 supplies a driving current to the light-emitting element 350-j in accordance with a gate voltage applied to a gate. When the gate voltage is at a low level, the driving current decreases, and the light-emitting element 350-j turns off. The lighting signal line 708-j is connected to a gate of a MOSFET Q2. The MOSFET Q2 turns on when the lighting signal el[j] is high and passes a voltage charged in a capacitor C1 to the MOSFET Q1. A signal line 1004-j is connected to a gate of a MOSFET Q3. The MOSFET Q3 turns on and off in accordance with a selection signal from the selection circuit 1007. That is, the MOSFET Q3 turns on when the selection signal is high, applying the analog voltage outputted from the DAC 1002 to the capacitor C1 and charging the capacitor C1. In the present embodiment, the DAC 1002 sets the analog voltage in the capacitor C1 prior to image formation. During an image forming period, the MOSFET Q3 is turned off, and the capacitor C1 continuously maintains a voltage level. By this, the MOSFET Q1 supplies and stops the supply of the driving current corresponding to the set analog voltage to the light-emitting element 350-1 in accordance with the lighting signal.

If an input capacitance of the light-emitting element 350-j is too large, a response speed for switching the light-emitting element 350-j from on to off becomes slow. Therefore, a MOSFET Q4 and an inverter 1101 may be added to improve the response speed. A signal obtained by inverting a logic of the lighting signal el[j] is inputted into a gate of the MOSFET Q4 by the inverter 1101. When the lighting signal el[j] is at a low level, the gate of MOSFET Q4 is high. Therefore, the MOSFET Q4 turns on, making it possible to forcibly discharge the charge charged in the input capacitance of the light-emitting element 350-j.

[Streak Information]

Figure 12A:
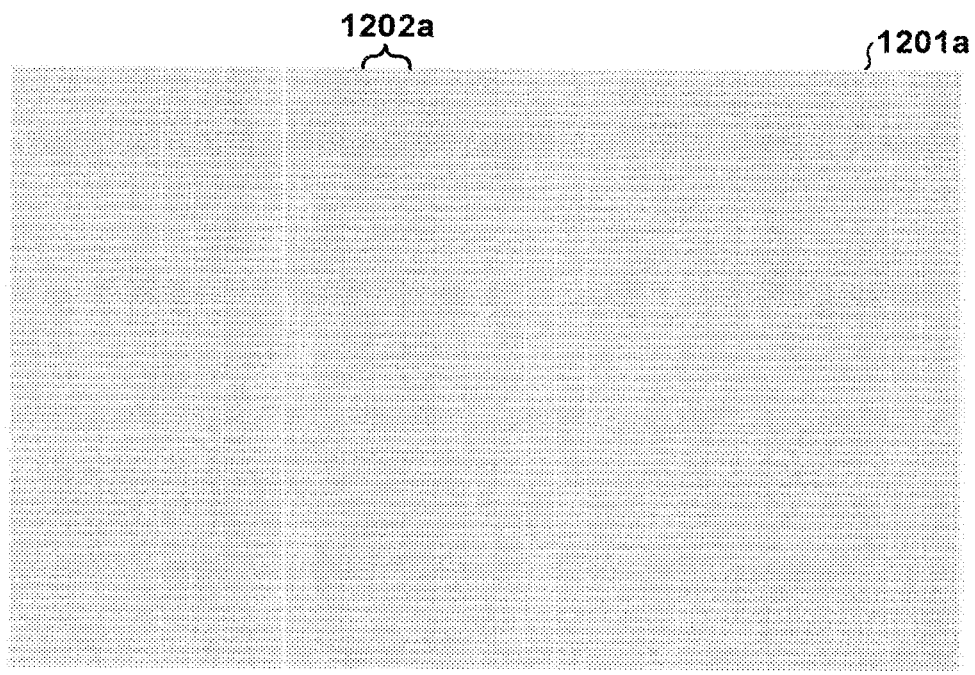
FIGS. 12A and 12B are diagrams for explaining streak-like images.
Figure 12B:
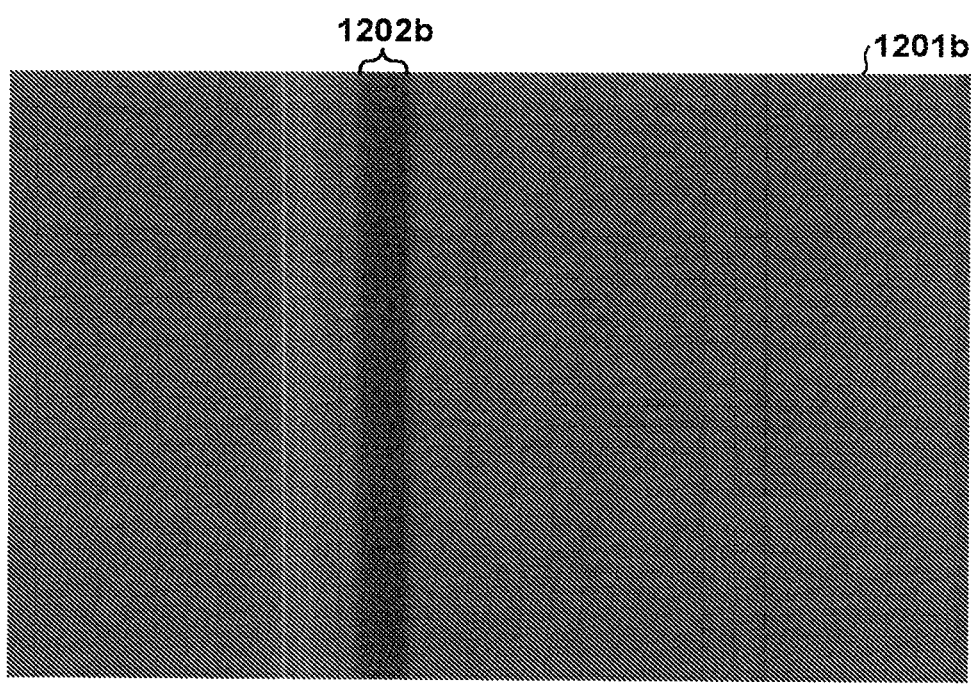

If some of the rod lenses constituting the rod lens array 203 are tilted, a spot size of the light that has passed through those rod lens may be widened. In this case, when a low density image 1201a is formed as illustrated in FIG. 12A, a streak-like image 1202a whose density is lower than the density of the surrounding image may be generated. In addition, when a high density image 1201b is formed as illustrated in FIG. 12B, a streak-like image 1202b whose density is higher than the density of the surrounding image may be generated. The streak-like images 1202a and 1202b occur parallel to the sub-scanning direction. In other words, the streak-like images 1202a and 1202b occur at the same main scanning position. Conventionally, such a rod lens array 203 has been discarded. In the present embodiment, streak-like density unevenness is reduced by correcting the image data based on characteristic information of such a rod lens array 203. This reduces the number of discarded rod lens arrays 203, thereby allowing effective utilization of resources. As a result, the yield of rod lens arrays is improved, thereby making it possible to suppress an increase in the cost of image forming apparatuses.

FIG. 13 illustrates an example of the streak information held in the information storage unit 610. According to FIG. 13, the streak information includes individual information for each streak occurring at a specific main scanning position. In this example, the individual information includes a streak number, a streak start position, and a streak rank. The streak number is identification information for distinguishing among a plurality of streaks. The streak start position indicates a start position of a streak image in the main scanning direction. In this example, a pixel number indicating a main scanning position is defined such that the number increases from a left side to a right side in the main scanning direction. The streak start position illustrated in FIG. 13 indicates a main scanning position on an assumption that a toner image is formed at 2400 dpi. For example, a streak start position of a streak assigned a streak number "1" is 100 [pix]. pix is an abbreviation for pixel. A streak start position of a streak assigned a streak number "2" is 1000 [pix]. In this example, streak information of five streaks is stored in the information storage unit 610; however, this is only one example. The number of pieces of streak information may vary depending on the exposure head 106.

Incidentally, there are cases where the exposure head 106 supports a plurality of resolutions, such as 2400 dpi and 1200 dpi. In this case, streak information for each resolution may be held in the information storage unit 610. In this case, the CPU 603 reads out the streak information corresponding to a resolution designated by the user from the information storage unit 610 and sets the streak information in the streak correction unit 615.

The streak rank is information indicating a degree of streak-like density unevenness that has been measured in advance. The streak rank may be expressed, for example, in four bits. In this case, the streak rank can indicate 16 levels of correction values. Further, one piece of streak information may hold a plurality of streak ranks. Generally, a width of a streak in the main scanning direction spans a plurality of pixels. A large amount of storage region becomes necessary to hold each of all the pixel numbers of the streak. Therefore, in the present embodiment, it is possible to identify a plurality of pixels to be corrected corresponding to the width of the streak by the streak start position and the streak rank. In the example of FIG. 13, 16 streak ranks are held for one streak. This is derived from a width (number of pixels) of one streak being approximately 16 pixels or less. In this example, a streak rank is held for each pixel; however, this is only one example. In order to reduce the memory necessary for storing streak ranks, one streak rank may be held for every two, four or eight pixels.

[Streak Correction Unit]

Figure 14:
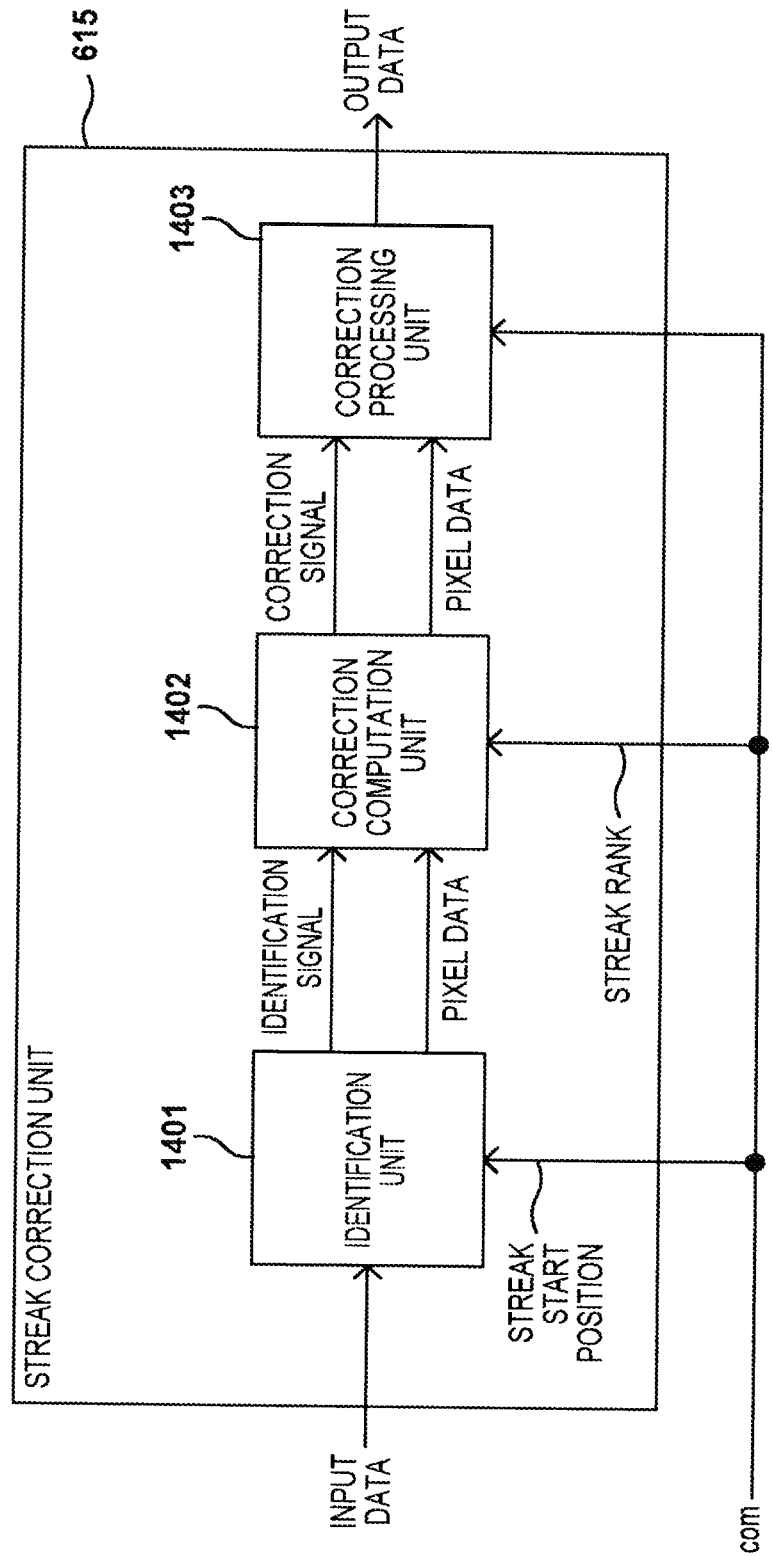
FIG. 14 is a block diagram of a streak correction unit.

As exemplified in FIG. 14, the streak correction unit 615 includes an identification unit 1401, a correction computation unit 1402, and a correction processing unit 1403. The identification unit 1401 determines whether input data (pixel data) is a pixel to be a target of streak correction. The pixel data is, for example, an 8-bit amount of light to be lit (luminance value or density value). The CPU 603 extracts a streak start position from the streak information and sets the streak start position in the identification unit 1401 via the communication signal com. The identification unit 1401 counts the pixel data in the main scanning direction. For example, the identification unit 1401 may include a counter for counting the clock signal clk. When a count value coincides with the streak start position, the identification unit 1401 outputs an identification signal indicating that it has identified the streak start position to the correction computation unit 1402. For example, the identification signal changes from low to high. In parallel with this, the identification unit 1401 sequentially outputs pixel data constituting image data one at a time to the correction computation unit 1402, based on the clock signal clk.

The CPU 603 extracts a streak rank from the streak information and sets the streak rank in the correction computation unit 1402 via the communication signal com. When the identification signal from the identification unit 1401 changes from low to high, the correction computation unit 1402 recognizes the pixel data inputted from the identification unit 1401 as a correction target. The identification unit 1401 computes a correction value based on the streak rank set by the CPU 603 and outputs a correction signal indicating the correction value to the correction processing unit 1403. In parallel with this, the identification unit 1401 sequentially outputs pixel data constituting image data one at a time to the correction processing unit 1403, based on the clock signal clk.

The correction processing unit 1403 takes input of the correction signal and the pixel data outputted from the correction computation unit 1402. The correction processing unit 1403 corrects the pixel data in accordance with the correction signal. Image data consisting of a series of pixel data outputted from the correction processing unit 1403 is outputted to the conversion unit 602.

[Operation for Identifying Correction Target]

Figure 15:
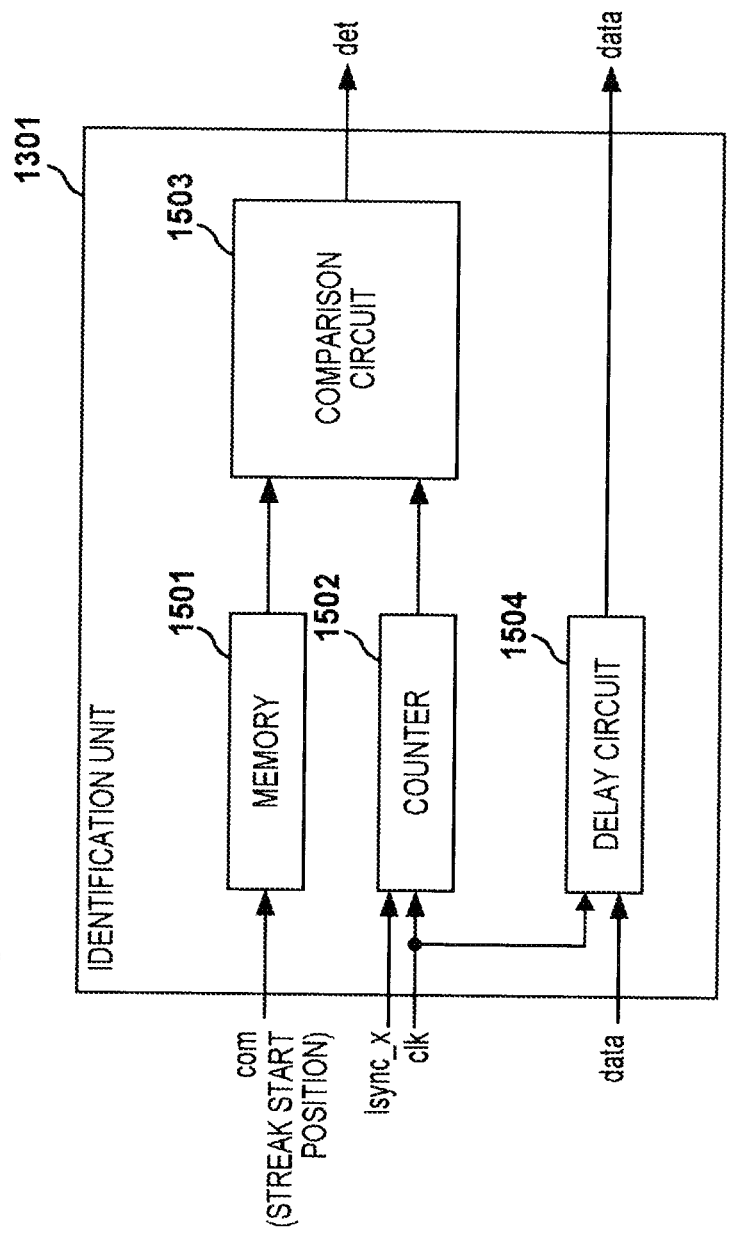
FIG. 15 is a block diagram of an identification unit.

FIG. 15 is a diagram illustrating an example of a configuration of the identification unit 1401. FIG. 16A is a timing chart indicating operation of the identification unit 1401. The CPU 603 writes a streak start position extracted from the streak information into a memory 1501. The memory 1501 sets the written streak start position in a comparison circuit 1503. As illustrated in FIG. 16A, a counter 1502 is a counter circuit that increments by one each time the clock signal clk is inputted. As illustrated in FIG. 16A, a count value of the counter 1502 indicates the main scanning position. The counter 1502 is reset to 0 when the line synchronization signal lsync_x is inputted. The comparison circuit 1503 determines whether the streak start position and the count value (current main scanning position) coincide. If the streak start position and the count value (current main scanning position) do not coincide, the comparison circuit 1503 maintains an identification signal det at a low level. Meanwhile, if the streak start position and the count value coincide, the comparison circuit 1503 outputs a high-level identification signal det for a predetermined number of pixels. In a case illustrated in FIG. 16A, when the count value (main scanning position) coincides with a streak start position 100, the identification signal det changes from low to high. Also, in the case of FIG. 16A, the identification signal det is maintained at high for 16 pixels. This indicates that 16 pixels including a pixel corresponding to the streak start position are identified as correction targets. In this case, it is assumed that the number of pixels to be correction targets coincides with the number of streak ranks. A delay circuit 1504 delays a plurality of pixel data constituting image data by an amount of time corresponding to one clock signal clk and outputs the plurality of pixel data. The delay circuit 1504 may be realized by, for example, a flip-flop circuit. As illustrated in FIG. 16A, the output data is delayed by one clock signal clk with respect to the input data.

[Computation of Correction Value]

FIG. 17 illustrates an example of a computation table in which a streak rank and image data are taken as input and a correction value is outputted. The correction computation unit 1402 determines the correction value by referencing the computation table based on a value of the input data and a value of the streak rank. The correction computation unit 1402 may be realized by the CPU 603. The CPU 603 may compute the correction value from the value of the input data and the value of the streak rank using the computation table or a function. In a case illustrated in FIG. 17, only 0 and 255 are indicated as image data (pixel data); however, there actually are 16 streak ranks and 16 correction values associated therewith also for each density value (luminance value) from 1 to 254.

FIG. 16B is a timing chart indicating operation of the correction computation unit 1402. When the identification signal det inputted from the identification unit 1401 is high, the correction computation unit 1402 computes and outputs a correction value based on a streak rank set by the CPU 603. The correction computation unit 1402 is configured by a logical circuit and, therefore, operates using a rise of the clock signal clk as a reference. Therefore, the output data is outputted, being delayed by one clock signal clk with respect to the input data. The correction computation unit 1402 does not correct the image data since correction of image data based on the correction value is performed by the correction processing unit 1403.

[Processing for Correcting Streak]

Figure 16C:
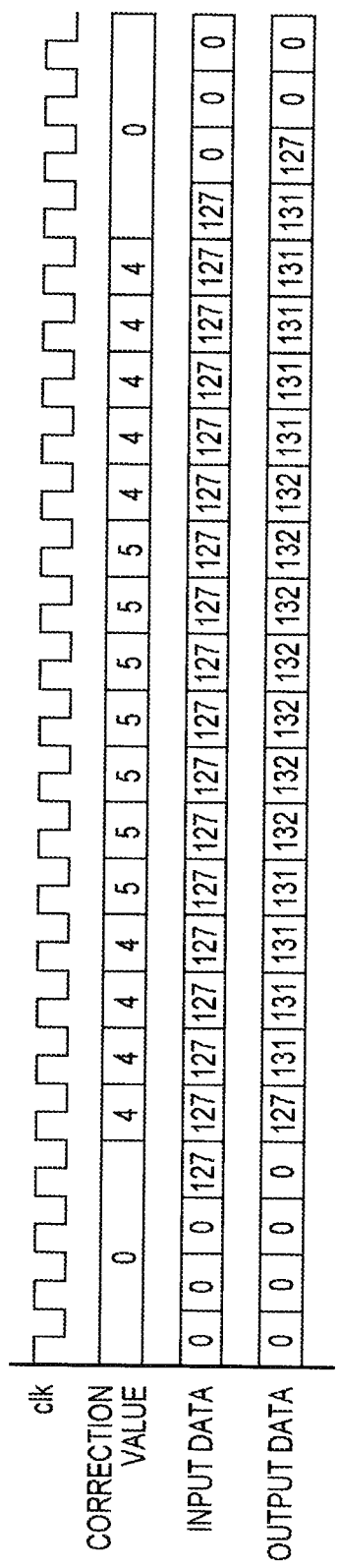

FIG. 16C is a timing chart indicating operation of the correction processing unit 1403. The correction processing unit 1403 is configured by a logical circuit and, therefore, operates using a rise of the clock signal clk as a reference. The correction processing unit 1403 generates output data by adding the correction value indicated by the correction signal to the input data. In the present embodiment, the output data is generated by adding the correction value and the input data; however, this is only one example. The output data may be determined by referencing a look-up table based on the input data and the correction value. Alternatively, pattern matching in which the output data is generated based on the input data and the correction value, may be employed. The output data may be generated by a filter operation based on the input data and the correction value.

The streak correction unit 615 thus executes streak correction on the image data based on the streak information stored in the information storage unit 610. This makes it possible to effectively utilize a rod lens array 203 that, conventionally, would have been discarded. That is, it becomes possible to promote an effective use of resources.

It also becomes possible to reduce density unevenness (streak image) attributable to tilting of the rod lens array 203 at a relatively low cost.

In the above-described embodiment, the streak correction unit 615 has been described to be implemented by a logic circuit; however, this is only one example. The streak correction unit 615 may be implemented by the CPU 603 and a program.

(1) Processing for Correcting Streak by Pattern Matching

Figure 18:
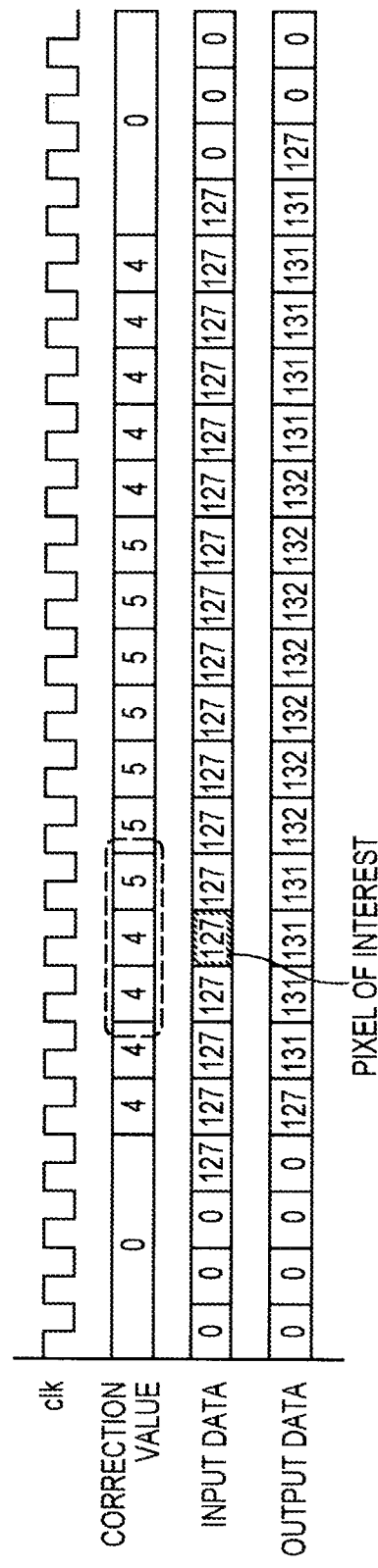
FIG. 18 is a diagram for explaining another example of a correction method.

FIG. 18 illustrates an example of processing for correcting a streak by pattern matching. Here, the focus is placed on a correction value of a preceding pixel and a correction value of a subsequent pixel, which are arranged adjacently to a pixel of interest in the main scanning direction. If a combination of the correction value of the preceding pixel, a correction value of the pixel of interest, and the correction value of the subsequent pixel coincides with a predetermined combination (pattern), a pixel value of the pixel of interest will be corrected using the correction value of the pixel of interest. For example, if a correction value of an i−1-th pixel is c, a correction value of an i-th pixel is c, and a correction value of an i+1-th pixel is c+1, the correction value of the i-th pixel will be determined to be +c. That is, if a pixel value of the i-th pixel is r, a pixel value of an output pixel will be r+c. As exemplified in FIG. 18, assume that the correction value of the preceding pixel is 4, the correction value of the pixel of interest is 4, and the correction value of the subsequent pixel is 5. In this case, the output pixel is the input pixel corrected by +4 (127+4=131). These numerical values are only one example.

(2) Processing for Correcting Streak by Filter Processing

Similar to pattern matching, filter processing generates the output pixel using the correction values of pixels preceding and subsequent to the pixel of interest. As an example, the focus is placed on one preceding pixel and one subsequent pixel, which are arranged adjacently to a pixel of interest in the main scanning direction. That is, a pixel value of the output pixel is determined from respective correction values of the three pixels including the pixel of interest and a filter coefficient. For example, a 3×1 filter to be applied to a 3×1 pixel group, which is three pixels in the main scanning direction and one pixel in the sub-scanning direction, is employed as a filter. As an example, assume that a correction value of the preceding pixel is 4 and its filter coefficient is 20 [%]. Assume that a correction value of the pixel of interest is 4 and its filter coefficient is 80 [%]. Further, assume that a correction value of the subsequent pixel is 5 and its filter coefficient is 20 [%]. In this case, the correction value of the pixel of interest is calculated as follows.

$$\text{correction value} = 4 \times 0.2 + 4 \times 0.8 + 5 \times 0.2 = 1 + 3 + 2 = 5 \qquad \text{Eq. 1}$$

The numerical values are only one example.

<Technical Concept Derived from Embodiment>

As illustrated in FIG. 1, the photosensitive drum 102 is an example of a photosensitive body that is driven to rotate. The light-emitting elements 350-1 to 350-m are an example of a plurality of light-emitting elements arranged in a direction intersecting a direction of rotation of the photosensitive body. The rod lens array 203 is an example of a rod lens array for causing light outputted from each of the plurality of light-emitting elements to be formed into an image on the photosensitive body. The exposure head 106 is an example of an exposure head for forming a latent image on the photosensitive body. The information storage unit 610 is an example of a storage unit for storing characteristic information indicating an image forming characteristic (e.g., streak information) of the rod lens array. The CPU 603 or the streak correction unit 615 functions as a correction unit for reducing streak-like density unevenness occurring in the latent image by correcting image data for driving the plurality of light-emitting elements based on the characteristic information read out from the storage unit. This makes it possible to also mount on the exposure head 106 a rod lens array 203 that, conventionally, would have been discarded. That is, it becomes possible to promote an effective use of resources regarding the rod lens array 203.

The identification unit 1401 is an example of an identification unit for identifying a pixel to be corrected in the image data based on the characteristic information. The CPU 603 or the streak correction unit 615 corrects pixel data of the pixel specified by the identification unit based on the characteristic information. Streak-like density unevenness may be reduced by this.

The characteristic information may include positional information (e.g., a streak start position) indicating a position of the pixel to be corrected among a plurality of pixels constituting the image data and a correction level (e.g., streak rank) to be applied to the pixel data of the pixel to be corrected.

The positional information (e.g., the streak start position) may be information indicating a position of a first pixel among a series of pixels to be further corrected among the plurality of pixels constituting the image data. A storage capacity of the characteristic information may be reduced by this.

The characteristic information may include a correction level (e.g., 16 streak ranks) for each of the series of pixels to be corrected. As exemplified in FIG. 13, the characteristic information may include one correction level for each pixel among the series of pixels to be corrected. Alternatively, the characteristic information may include one common correction level for N (N is an integer of 2 or more) pixels of the series of pixels to be corrected. For example, one common streak rank may be provided for every two pixels. One common streak rank may be provided for every four pixels. Alternatively, one common streak rank may be provided for every eight pixels.

The CPU 603 or the correction computation unit 1402 may function as a computation unit for computing a correction value for each pixel based on the correction level. The CPU 603 or the correction processing unit 1403 may function as a correction processing unit for executing correction processing on the image data for each pixel based on the correction value obtained for each pixel.

The CPU 603 or the correction processing unit 1403 may correct a pixel value of a pixel of interest by adding the correction value obtained by the CPU 603 or the correction computation unit 1402 for the pixel of interest to the pixel value of the pixel of interest.

The CPU 603 or the correction processing unit 1403 may obtain a corrected pixel value for the pixel of interest by referencing a table based on the pixel value of the pixel of interest and the correction value obtained by the correction computation unit 1402 for the pixel of interest.

The correction computation unit 1402 computes a first correction value for a preceding pixel that is positioned precedingly to the pixel of interest in the main scanning direction. The correction computation unit 1402 computes a second correction value for the pixel of interest. The correction computation unit 1402 computes a third correction value for a subsequent pixel that is positioned subsequently to the pixel of interest in the main scanning direction. If the first correction value, the second correction value, and the third correction value are in a predetermined pattern, the CPU 603 or the correction processing unit 1403 may apply the second correction value to the pixel value of the pixel of interest. If the first correction value, the second correction value, and the third correction value are not in a predetermined pattern, the CPU 603 or the correction processing unit 1403 need not correct the pixel value of the pixel of interest.

The correction processing unit 1403 may calculate a first product by multiplying the first correction value obtained for the preceding pixel by a first filter coefficient. The correction processing unit 1403 may calculate a second product by multiplying the second correction value obtained for the pixel of interest by a second filter coefficient. The correction processing unit 1403 may calculate a third product by multiplying the third correction value obtained for the subsequent pixel by a third filter coefficient. Furthermore, the correction processing unit 1403 may obtain a total correction value by adding the first product, the second product, and the third product and correct the pixel value of the pixel of interest using the total correction value.

The counter 1502 may function as a counting unit for counting the main scanning position based on a clock signal. The comparison circuit 1503 may function as a determination unit for determining whether the main scanning position counted by the counting unit coincides with the position of the pixel to be corrected. When the determination unit outputs a predetermined signal (e.g., identification signal det) indicating that the main scanning position counted by the counting unit and the position of the pixel to be corrected coincide, the CPU 603 or the correction computation unit 1402 starts computation of a correction value.

A storage unit (e.g., the information storage unit 610) may be provided in the exposure head 106. Streak-like density unevenness attributable to a manufacturing accuracy of the rod lens array 203 varies for each exposure head 106. Therefore, the streak information may be obtained in the assembly process of the exposure head 106 and written in the information storage unit 610 of the exposure head 106. This makes it possible to correct streak-like density unevenness using appropriate streak information for each exposure head 106.

Second Embodiment

Figure 19:
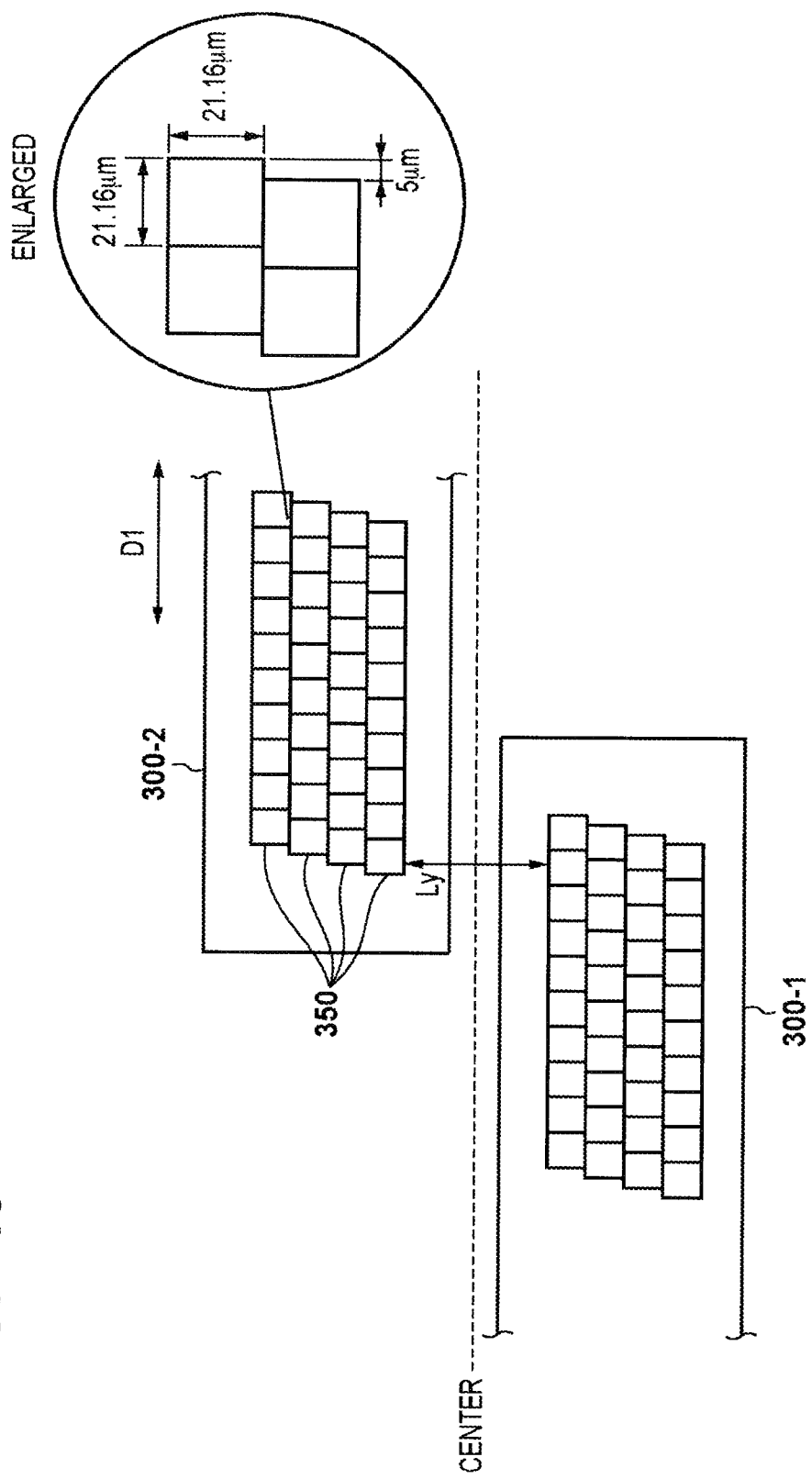
FIG. 19 is a diagram for explaining light-emitting element arrays and light-emitting element groups in the light-emitting element arrays according to an embodiment.

FIG. 19 schematically illustrates the light-emitting element arrays 300 and arrays of light-emitting elements 350 in the light-emitting element arrays 300. In the present embodiment, the light-emitting element group 201 is configured by light-emitting elements included in 20 light-emitting element arrays 300-1 to 300-20. The light-emitting element arrays 300-1 to 300-20 are regularly arranged in the first direction (here, in two lines in a staggered manner). More specifically, 10 light-emitting element arrays 300-*n*, where n is an odd number, forms one line, and another 10 light-emitting element arrays 300-*n*, where n is an even number, forms another line, and positions of the two lines in the second direction are different. In the present specification, the light-emitting element arrays 300 of the former line are also referred to as odd-numbered light-emitting element arrays 300, and the light-emitting element arrays 300 of the latter line are also referred to as even-numbered light-emitting element arrays 300. The light-emitting element arrays 300-1 to 300-20 are collectively referred to as light-emitting element arrays 300. Each of the light-emitting element arrays 300 of the printed circuit board 202 is connected to an image controller 2200 (FIG. 22) via the connector 305. In the following, for descriptive convenience, a small sub-number side of the light-emitting element arrays 300-1 to 300-20 arranged along the first direction may be referred to as "left", and a large sub-number side may be referred to as "right". For example, the light-emitting element array 300-1 is a leftmost light-emitting element array 300, and the light-emitting element array 300-20 is a rightmost light-emitting element array.

In the present embodiment, light-emitting element elements of each of the light-emitting element arrays 300 are arranged two dimensionally, consisting of N columns (N is an integer of 2 or more) in the first direction and M rows (M is an integer of 2 or more) in the second direction. In an exemplary embodiment, N may be 748 and M may be 4, and in this case, each of the light-emitting element arrays 300 includes a total of 2992 (=748×4) light-emitting elements 350. In the entire light-emitting element group 201 constituting 20 light-emitting element arrays 300, there are 14960 light-emitting elements arranged in the first direction. A pitch of light-emitting elements 350 adjacent to each other in the first direction may be approximately 21.16 µm corresponding to a resolution of 1200 dpi. In this case, a length of the entire light-emitting element group 201 in the first direction is approximately 316 mm (a maximum width of an image that can be formed), and a length of each of the light-emitting element arrays 300 in the first direction is approximately 15.8 mm. M light-emitting elements of each column are arranged in a stepped manner, being shifted in the first direction at a pitch of approximately 5 µm corresponding to a resolution of 4800 dpi. FIG. 19 illustrates an example in which a lower light-emitting element is shifted to the left among two upper and lower light-emitting elements; however, the lower light-emitting element may be shifted to the right. Furthermore, as illustrated in FIG. 19, light-emitting elements in a rightmost column of the odd-numbered light-emitting element array 300 and light-emitting elements of a leftmost column of the even-numbered light-emitting element array 300 may be arranged to overlap in the first direction. Similarly, light-emitting elements in a leftmost column of the odd-numbered light-emitting element array 300 and light-emitting elements of a rightmost column of the even-numbered light-emitting element array 300 may be arranged to overlap in the first direction. A space Ly between the light-emitting element arrays of these light-emitting element arrays 300 may be, for example, approximately 105 µm. By thus arranging the light-emitting element arrays to overlap in the first direction, it is possible to avoid a situation in which a gap is formed in an exposable range due to variations in mounting. When such an overlapping arrangement is employed, typically, only the light-emitting elements in one of the overlapping columns are used as an effective light-emitting element that may emit light according to image data. The light-emitting elements in the other column need not be used regardless of the image data. The number of columns or the number of light-emitting elements to be arranged to overlap in the first direction is not limited to the above-described example (one column, 4 pixels) and may be any number.

FIG. 4 is a plan view illustrating a schematic configuration of a light-emitting element array 300. A plurality of light-emitting elements 350 of each of the light-emitting element arrays 300 is formed on the light emission substrate 402, which is, for example, a silicon substrate. Further, the light emission substrate 402 is provided with the circuit unit 406 for driving the plurality of light-emitting elements 350. A plurality of pads 408 are used to connect to the circuit unit 406 a signal line for communicating with the image controller 2200, a power supply line for connecting to a power source, and a ground line for connecting to the ground. The signal line, power supply line, and ground line may be, for example, wires made of gold.

Figure 20:
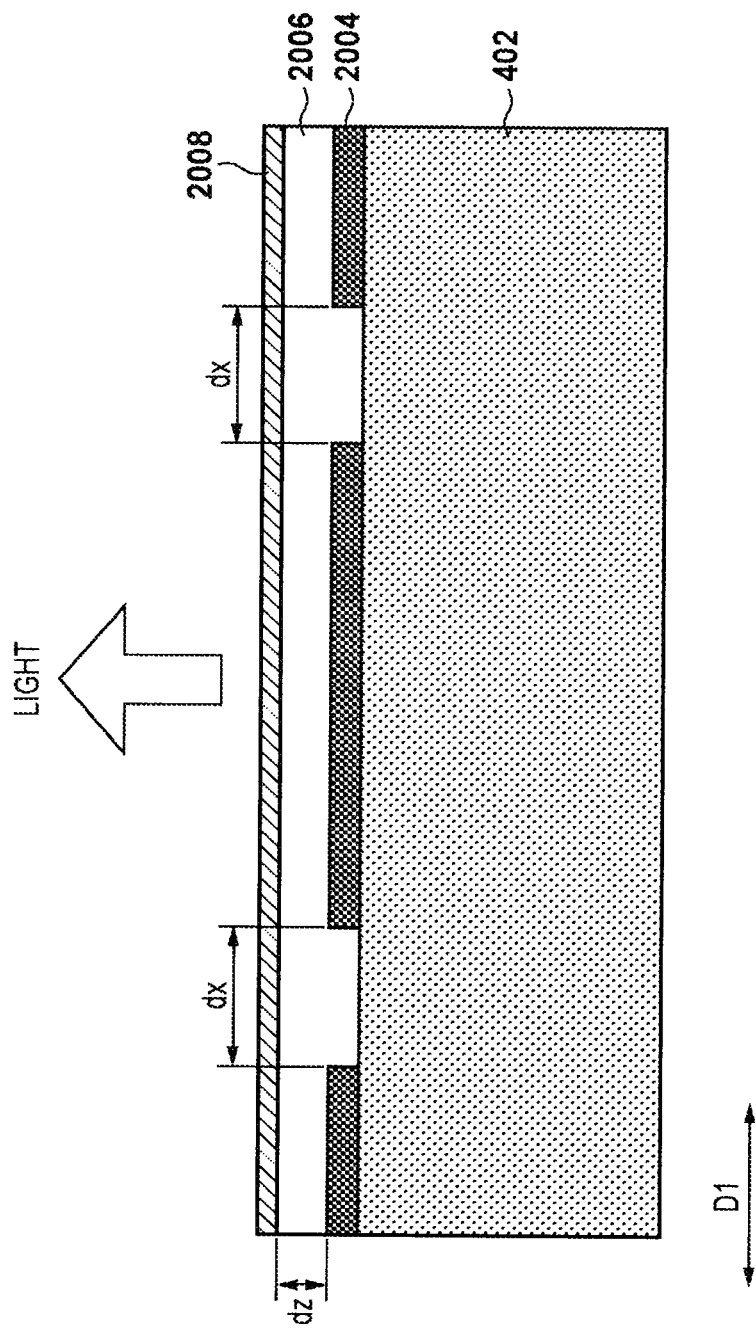
FIG. 20 is a cross-sectional view illustrating a schematic configuration of a light-emitting element array according to an embodiment.

FIG. 20 illustrates a portion of a cross-section across a line A-A of FIG. 4. A plurality of lower electrodes 2004 are formed on the light emission substrate 402. A light-emitting layer 2006 is provided on the lower electrodes 2004, and an upper electrode 2008 is provided on the light-emitting layer 2006. The upper electrode 2008 is one common electrode for the plurality of lower electrodes 2004. When a voltage is applied between the lower electrodes 2004 and the upper electrode 2008, a current flows from the lower electrodes 2004 to the upper electrode 2008, and the light-emitting layer 2006 thereby emits light. Therefore, one lower electrode 2004 and a partial region of the light-emitting layer 2006 and a partial region of the upper electrode 2008 corresponding to that lower electrode 2004 constitute one light-emitting element 350. dx in the drawing is a space between two adjacent lower electrodes 2004. dz is a space between the lower electrodes 2004 and the upper electrode 2008. By setting dx to be greater than dz, it is possible to suppress a leakage current between the adjacent lower electrodes 2004 and prevent a light-emitting element 350 that should not emit light from erroneously emitting light.

In the present embodiment, it is assumed that each light-emitting element 350 is configured to be an organic electroluminescence (EL) element. For example, an organic EL film may be used for the light-emitting layer 2006. In another embodiment, by using an inorganic EL film for the light-emitting layer 2006, each light-emitting elements 350 may be configured to be an inorganic EL element. Generally, each light-emitting element 350 may be any type of a light-emitting diode (LED).

The upper electrode 2008 is configured by a transparent electrode, such as indium tin oxide (ITO), so as to transmit a light emission wavelength of the light-emitting layer 2006. In the example of FIG. 20, the entire upper electrode 2008 transmits the light emission wavelength of the light-emitting layer 2006; however, the entire upper electrode 2008 does not necessarily have to transmit the light emission wavelength. Specifically, a partial region through which light from each light-emitting element 350 passes need only transmit the light emission wavelength.

In FIG. 20, one continuous light-emitting layer 2006 is formed; however, a plurality of light-emitting layers 2006 each having a width equivalent to a width of a lower electrode 2004 may be formed on the lower electrodes 2004, respectively. Further, in FIG. 20, the upper electrode 2008 is formed as one common electrode for the plurality of lower electrodes 2004; however, a plurality of upper electrodes 2008 each having a width equivalent to a width of a lower electrode 2004 may be formed corresponding to each of the lower electrodes 2004. Among the lower electrodes 2004 of each of the light-emitting element arrays 300, a first plurality of lower electrodes 2004 may be covered by a first light-emitting layer 2006 and a second plurality of lower electrodes 2004 may be covered by a second light-emitting layer 2006. Similarly, among the lower electrodes 2004 of each of the light-emitting element arrays 300, a first upper electrode 2008 may be formed in common corresponding to the first plurality of lower electrodes 2004 and a second upper electrode 2008 may be formed in common corresponding to the second plurality of lower electrodes 2004. Also in such a configuration, one lower electrode 2004 and a region of the light-emitting layer 2006 and a region of the upper electrode 2008 corresponding to that lower electrode 2004 constitute one light-emitting element 350.

<Multiple Exposure>

The use of organic EL elements as the light-emitting elements 350 facilitates miniaturization and cost reduction of an apparatus; however, the amount of light that a single organic EL element can emit may be insufficient for forming an image of a desired density. Therefore, in the present embodiment, a multiple exposure technique in which each pixel region (spot region) on the photosensitive drum 102 is exposed multiple times by a plurality of light-emitting elements 350 arranged in a circumferential direction of the photosensitive drum 102 sequentially emitting light is incorporated.

Figure 21:
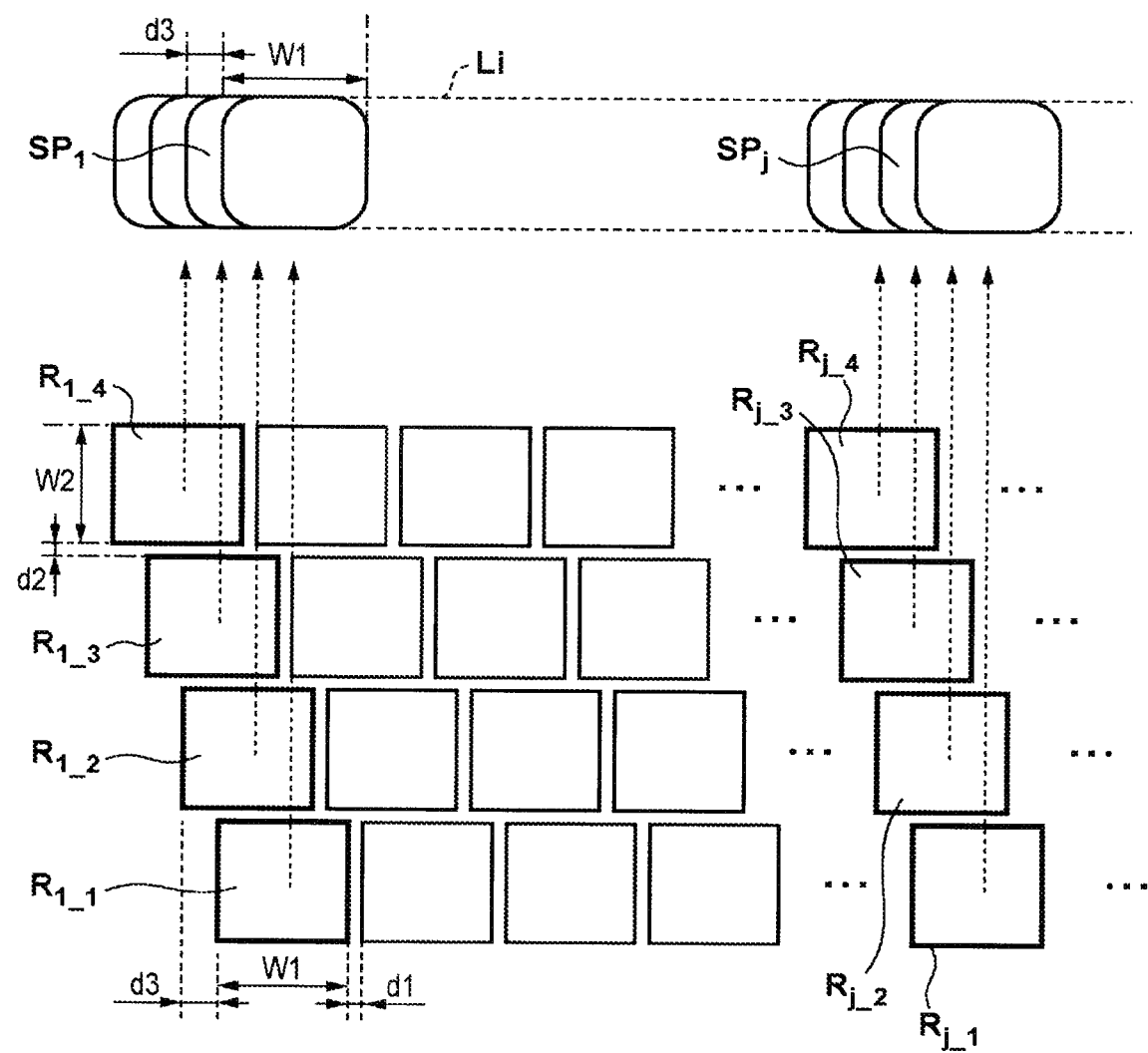
FIG. 21 is a diagram for explaining multiple exposure by light-emitting elements arranged in a stepped manner.

FIG. 21 is a diagram for explaining multiple exposure by light-emitting elements arranged in a stepped manner. As described above, in the present embodiment, M light-emitting elements 350 of each column of a light-emitting element array may be arranged in a stepped manner at a constant pitch. Here, an example of an arrangement of the light-emitting elements in a case where M=4 is partially illustrated. (j={1, 2, ..., N}, m={0, 1, 2, 3}) in the drawing represents a light-emitting element 350 of a j-th column from the left in the first direction and an m-th row from the bottom in the second direction. W1 in the drawing represents a width of a light-emitting element 350 in the first direction, and W2 represents a width of a light-emitting element 350 in the second direction. d1 represents a space between adjacent light-emitting elements 350 in the first direction, and d2 represents a space between adjacent light-emitting elements 350 in the second direction. d1 and d2 are representations of the above-described inter-electrode distance dx, separately for two coordinate axes, and both are determined to be wider than the space dz between the upper electrode and a lower electrode. As described above, a pitch d3 of the light-emitting elements 350 may be, at minimum, approximately 5 μm (equivalent to 4800 dpi) in the first direction.

By four light-emitting elements of each column being arranged in a stepped manner as in the example of FIG. 21, any two adjacent light-emitting elements of the four light-emitting elements occupy a range partially overlapping in the first direction. Then, by four light-emitting elements of a column corresponding to a respective pixel position of input image data sequentially emitting light while the photosensitive drum 102 is rotating, a spot corresponding to a respective pixel position is formed on the surface of the photosensitive drum 102. In the example of FIG. 21, if a leftmost pixel value of an i-th line of the input image data indicates that light be emitted, light-emitting elements $R_{1\_1}$, $R_{1\_2}$, $R_{1\_3}$, and $R_{1\_4}$ sequentially emit light each at a timing at which it faces a line $L_i$ on the surface of the photosensitive drum 102. Consequently, a leftmost spot region of the line $L_i$ is exposed multiple times, thereby forming a corresponding spot $SP_1$. Similarly, if a j-th pixel value from the left of the i-th line of the input image data indicates that light be emitted, light-emitting elements $R_{j\_1}$, $R_{j\_2}$, $R_{j\_3}$, and $R_{j\_4}$ sequentially emit light each at a timing at which it faces the line $L_i$ on the surface of the photosensitive drum 102. Consequently, a j-th spot region from the left of the line Li is exposed multiple times, thereby forming a corresponding spot $SP_j$. Assuming that a pitch of the light-emitting elements in the second direction is about 21.16 μm and a conveyance speed of a sheet is 200 mm/s, a period (line period) in which each line is exposed by one light-emitting element may be approximately 105.8 μs. By four light-emitting elements in each column of 20 light-emitting element arrays 300 thus sequentially emitting light at appropriate timings, a line of a smooth electrostatic latent image comprising a series of mutually partially overlapping spots with constant spot intervals may be formed on the surface of the photosensitive drum 102. Then, as a result of such a line being successively formed in the circumferential direction, a two-dimensional electrostatic latent image is generated.

In the following description, a spot region in which an electrostatic latent image spot is to be formed as a result of multiple exposure by the M light-emitting elements 350 emitting light is also referred to as an "exposure dot", and a spot region where a spot is not to be formed due to the light-emitting elements 350 not emitting light is also referred to as a "non-exposure dot".

<Configuration of Control Circuit>

Figure 22:
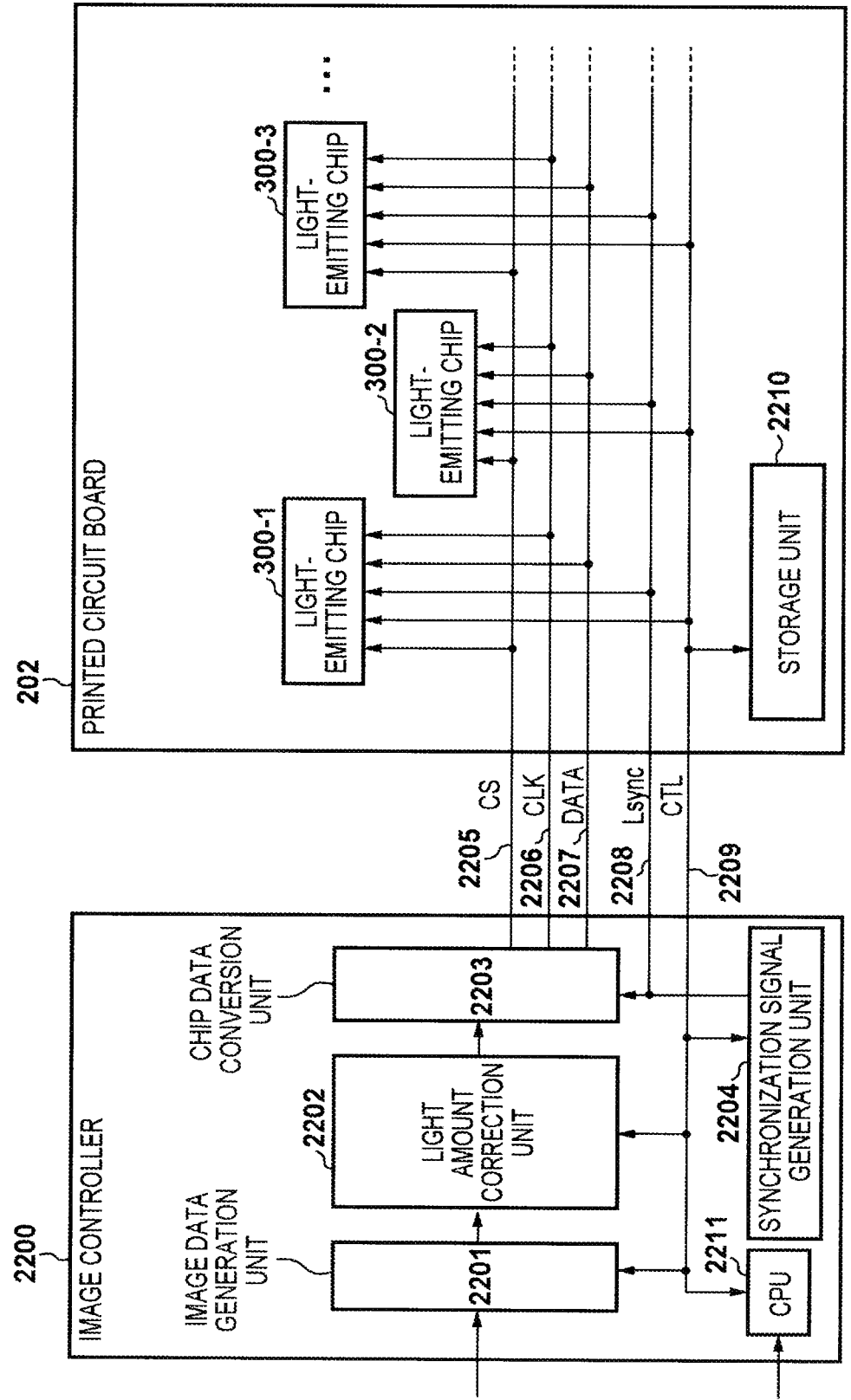
FIG. 22 is a configuration diagram of a control circuit for controlling light emission of light-emitting element arrays on the printed circuit board.

FIG. 22 illustrates an example of a configuration of a control circuit for controlling light emission of the light-emitting element array 300 on the printed circuit board 202. Here, for descriptive simplicity, processing for a single color component will be described; however, it is assumed that, in practice, the same processing is performed in parallel for four color components.

The image controller 2200 is a component constituting the exposure apparatus together with the exposure head 106. The image controller 2200 is connected to each of the light-emitting element arrays 300 on the printed circuit board 202 via a plurality of signal lines 2205 to 2209. The chip selection signal line 2205 carries a chip selection signal CS, which represents an effective range of image data. The clock signal line 2206 carries a clock signal CLK. The data signal line 2207 carries image data DATA. The synchronization signal line 2208 carries a line synchronization signal Lsync for identifying a line period of the image data. The communication signal line 2209 carries a control signal CTL.

An image data generation unit 2201 generates binary bitmap image data for controlling on and off of light emission of the light-emitting elements 350 of the light-emitting element arrays 300 on the printed circuit board 202 by performing image processing on image data received from the scanner unit 100 or an external apparatus. The image processing here may include, for example, raster conversion and halftone processing (e.g., dithering). The image data that has been subject to the halftone processing is a set of bits indicating whether or not corresponding M light-emitting elements 350 are to emit light for each position of pixels constituting an image to be formed. If a bit at a given pixel position indicates "light emission", a corresponding spot region on the surface of the photosensitive drum 102 will be an exposure dot. If the bit indicates "no light emission", a corresponding spot region will be a non-exposure dot. The image data generation unit 2201 outputs the generated image data to a light amount correction unit 2202.

The light amount correction unit 2202 performs correction processing for correcting unevenness in the amount of light of the exposure head 106 using correction data stored in a later-described memory (e.g., a storage unit 2210) on image data inputted from the image data generation unit 2201. Then, the light amount correction unit 2202 outputs the corrected image data to a conversion unit 2203. The correction of unevenness in the amount of light to be performed by the light amount correction unit 2202 will be described in detail later.

In each line period distinguished by the line synchronization signal Lsync, the conversion unit 2203 reads out pixel values in a corresponding readout range of the image data inputted from the light amount correction unit 2202 and transmits the image data indicating the read-out pixel values to the data signal line 2207. The image data DATA is, for example, a sequence of pixel values corresponding to the light-emitting elements 350 of the 20 light-emitting element arrays 300. The conversion unit 2203 designates which light-emitting element array 300 is to receive a respective portion of the image data DATA in accordance with the chip selection signal CS. The conversion unit 2203 generates the clock signal CLK in order to synchronize transmission and reception timings for respective signal values with each of the light-emitting element arrays 300 and supplies the clock signal CLK to each of the light-emitting element arrays 300.

A synchronization signal generation unit 2204 determines a delimiter of a line of image data, generates the line synchronization signal Lsync, and supplies the generated line synchronization signal Lsync to the synchronization signal line 2208.

The storage unit 2210 of the printed circuit board 202 is a memory (e.g., a non-volatile memory) for storing control data for controlling light emission by each of the light-emitting element arrays 300. As will be described later, the control data to be stored in the storage unit 2210 may include, for example, a setting value related to the amount of current to be supplied and correction data to be used for correction of input image data.

In each line period identified by the line synchronization signal Lsync, each of the light-emitting element arrays 300 drives each of the light-emitting elements 350 in accordance with light-amount-corrected image data inputted from the conversion unit 2203. For example, a respective light-emitting element array 300 receives a portion of the image data DATA for its chip via the data signal line 2207 if the chip selection signal CS indicates a data reception timing for its chip. Then, the respective light-emitting element array 300 drives each of the light-emitting elements 350 of the light-emitting element array of M rows and N columns according to pixel values included in the received image data.

A CPU 2211 controls the entire image forming apparatus 1. For example, the CPU 2211 controls the above-described generation of image data, correction of the amount of light, generation of the line synchronization signal, and transmission of image data to the printed circuit board 202. For example, the CPU 2211 reads out correction data stored in the storage unit 2210 of each of the light-emitting element arrays 300 in advance before executing a job for image formation and provides the read-out correction data to the light amount correction unit 2202.

Figure 23:
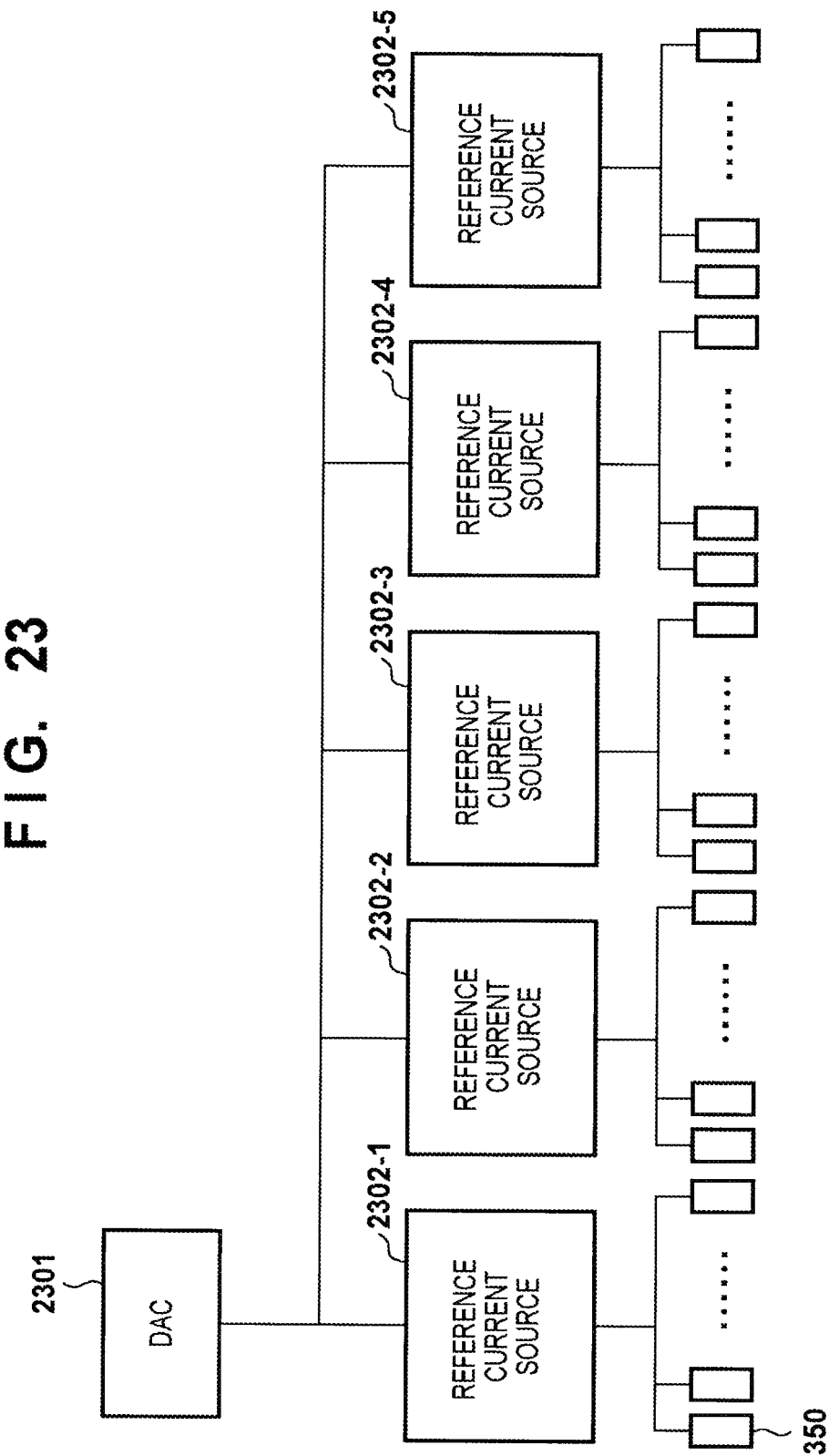
FIG. 23 is a block diagram illustrating a configuration of a circuit related to supply of current in light-emitting element arrays.

FIG. 23 is a block diagram illustrating a configuration of a circuit related to supply of current in the light-emitting element arrays 300. Each of the light-emitting element arrays 300 includes a digital-to-analog (D/A) converter 2301, a plurality (in the example of FIG. 23, five) reference current sources 2302-1 to 2302-5, and a plurality of light-emitting elements 350. Each light-emitting element 350 is supplied with current from any one of reference current sources 2302-1 to 2302-5 depending on the position of the light-emitting element 350 in the first direction.

The DAC 2301 performs digital-analog conversion on a digital value indicating a setting value of a reference current set by the CPU 2211 and outputs an analog signal having a voltage corresponding to the setting value to each reference current source 2302. The setting value of the reference current is stored in advance in the above-described storage unit 2210, read out by the CPU 2211, and outputted to the DAC 2301. Each of the reference current sources 2302-1 to 2302-5 supplies a reference current corresponding to the voltage of the analog signal inputted from the DAC 2301 to the light-emitting elements 350. The number of reference current sources 2302 provided in each of the light-emitting element arrays 300 is not limited to the above-described example and there may be any number of reference current sources 2302 depending on the length of wiring in the chip or a driving capability of the reference current sources 2302.

<Correction of Unevenness in Amount of Light>

<Various Causes>

Figure 24:
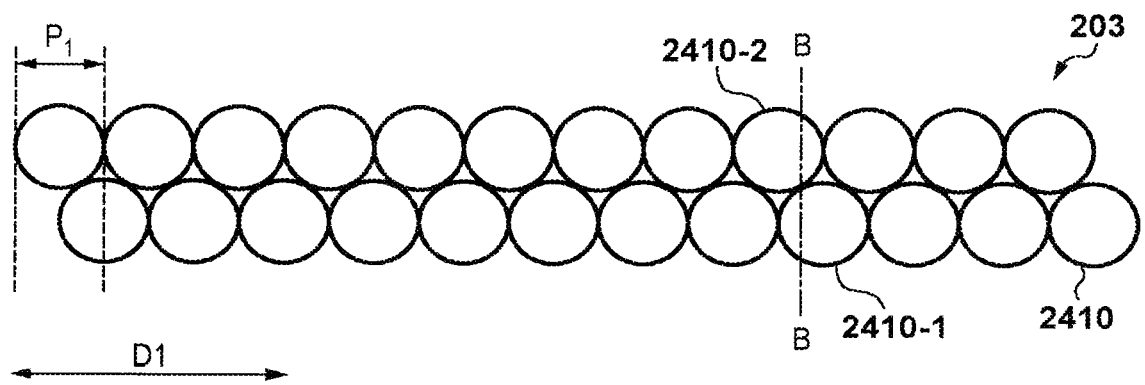
FIG. 24 is a diagram for explaining an arrangement of a plurality of lenses in a rod lens array.

There are various causes of unevenness in the amount of light generated in a solid-state exposure apparatus. This section describes the following three types of causes:

characteristic of rod lens array lens tilt in rod lens array shift in arrangement of light-emitting element arrays (1) Characteristic of Rod Lens Array First, a periodic characteristic of light that passes through the rod lens array will be described with reference to FIGS. 24 and 25. FIG. 24 illustrates an example of an arrangement of a plurality of lenses in the rod lens array 203. The rod lens array 203 includes a plurality of lenses 2410 arranged in at least the first direction. In the example of FIG. 24, the plurality of lenses 2410 of the rod lens array 203 form two lines in parallel to the first direction, and in each line, the lenses 2410 are regularly arranged at a pitch $P_1$.

Figure 25:
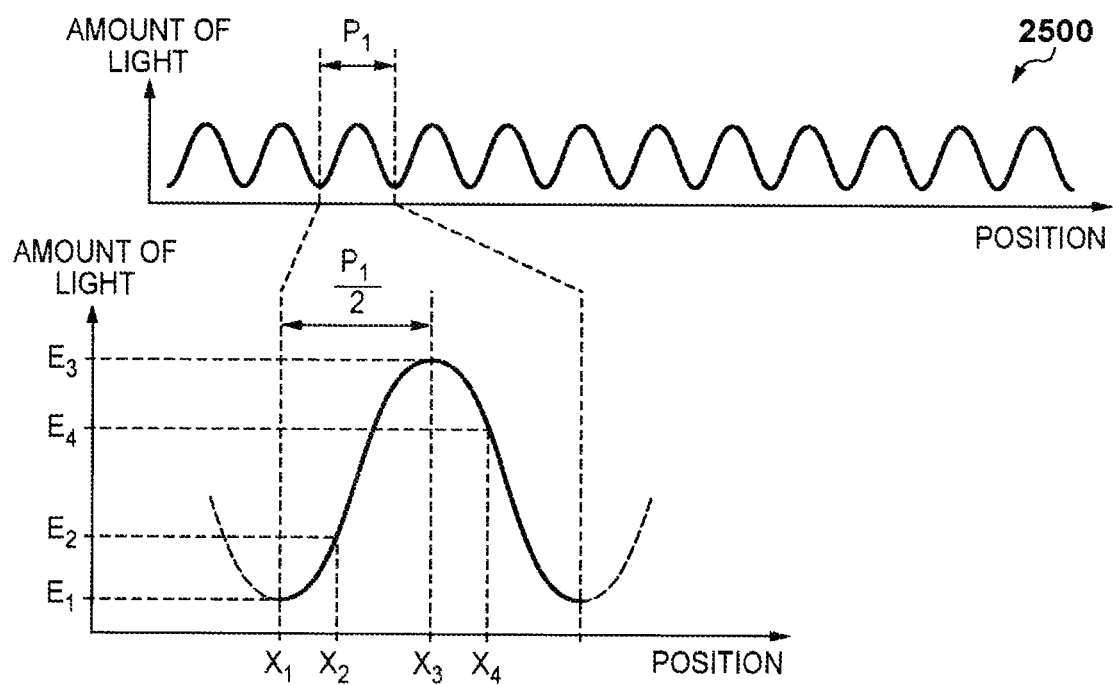
FIG. 25 is a diagram for explaining a periodic nature of light passing through the rod lens array.

A curve 2500 illustrated in an upper part of FIG. 25 schematically represents a light amount distribution that may be measured along the first direction after a completely uniform parallel light emitted from an ideal light source has passed through the rod lens array 203. The rod lens array 203 is an array of the plurality of lenses 2410 arranged at the pitch $P_1$; therefore, the light amount distribution represented by the curve 2500 has a characteristic of repeatedly increasing and decreasing in a lengthwise direction of the array at a period corresponding to the pitch $P_1$. Meanwhile, a plurality of light-emitting elements 350 are regularly arranged in parallel to the first direction also in a light-emitting element array 300 arranged to face the rod lens array 203. Thus, the distribution of light that is actually transmitted differs depending on where the respective light-emitting elements 350 are located in the pitch $P_1$ of the lenses 2410.

In an enlarged view of the curved line 2500 illustrated on a lower part of FIG. 25, positions $X_1$, $X_2$, $X_3$ and $X_4$ are candidates for positions of the light-emitting elements 350 that may be placed at a pitch that is smaller than the pitch $P_1$ of the lenses 2410. If the light-emitting elements 350 are located, for example, at the position $X_1$ and the position $X_3$, the amounts of light that has been emitted from the light-emitting elements 350 and has passed through the rod lens array 203 will be light amounts $E_1$ and $E_3$, respectively. Meanwhile, if the light-emitting element 350 are located, for example, at the position $X_2$ and the position $X_4$, the amounts of light that have been emitted from the light-emitting element 350 and have passed through the rod lens array 203 will be light amounts $E_2$ and $E_4$, respectively.

In this way, an exposure apparatus in which light from a light-emitting element group is formed into an image on the surface of a photosensitive body by a rod lens array demonstrates a light amount distribution including some sort of a frequency component even if there is no variation in manufacturing. Correction data to be described later in detail expresses such a frequency component of the light amount distribution by a frequency domain parameter. Typically, the distribution of the amount of light that has passed through the rod lens array 203 includes a frequency component corresponding to the pitch $P_1$ of the lenses 2410. Alternatively, the distribution of the amount of light that has passed through the rod lens array 203 also includes a frequency component corresponding to the pitch of the light-emitting elements 350 in each of the light-emitting element arrays 300.

(2) Lens Tilt in Rod Lens Array

Figure 26:
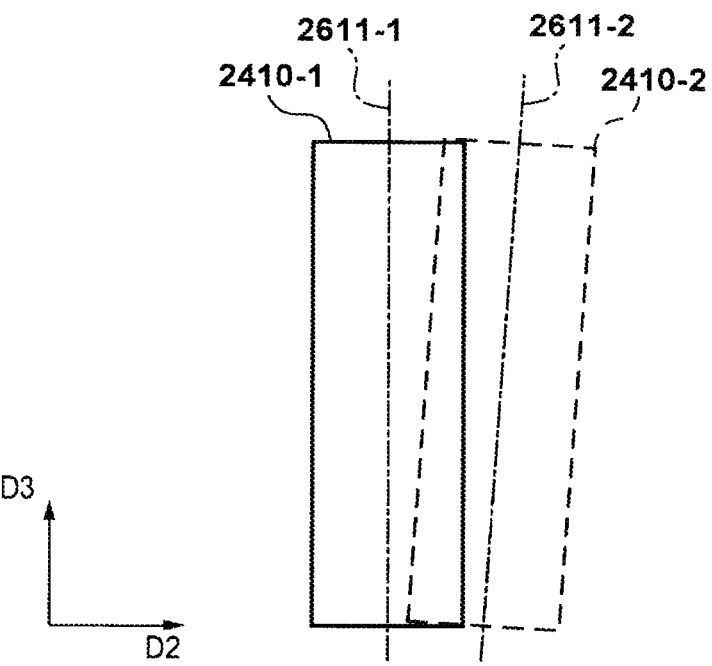
FIG. 26 is a schematic cross-sectional view illustrating an example of a tilt of a lens in the rod lens array.

Ideally, the plurality of lenses 2410 of the rod lens array 203 are arranged such that their central axes are all perpendicular to the light emission surface of the light-emitting elements 350 (parallel to an optical axis). However, in practice, the rod lens array 203 may be manufactured with the central axes of a small number of the lenses 2410 being tilted. FIG. 26 is a schematic cross-sectional view of the rod lens array 203 across a line B-B of FIG. 24 and illustrates an example of tilting of a lens due to a manufacturing error. A direction D3 in the drawing is a third direction orthogonal to the axial direction D1 (first direction) and the circumferential direction D2 (second direction) of the photosensitive body. In the example of FIG. 26, a lens 2410-1 is arranged without error and a central axis 2611-1 of the lens 2410-1 is parallel to the direction D3. Meanwhile, a lens 2410-2 is tilted due to a manufacturing error, and a central axis 2611-2 of the lens 2410-2 has a certain tilt angle with respect to the direction D3. A phenomenon that a rod lens in the rod lens array tilts in this way is also referred to as a lens tilt. Such a lens tilt occurs irregularly, causing blurring in image formation on the surface of the photosensitive drum 102 and, thereby, a non-periodic unevenness in the amount of light. It is possible to exclude from shipping targets a rod lens array in which a lens tilt has been detected in a pre-shipment inspection stage; however, if effects of the lens tilt can be eliminated by correcting the amount of light, it is possible to increase the yield, which is advantageous from the viewpoint of manufacturing cost.

(3) Shift in Arrangement of Light-Emitting Element Array

Figure 27:
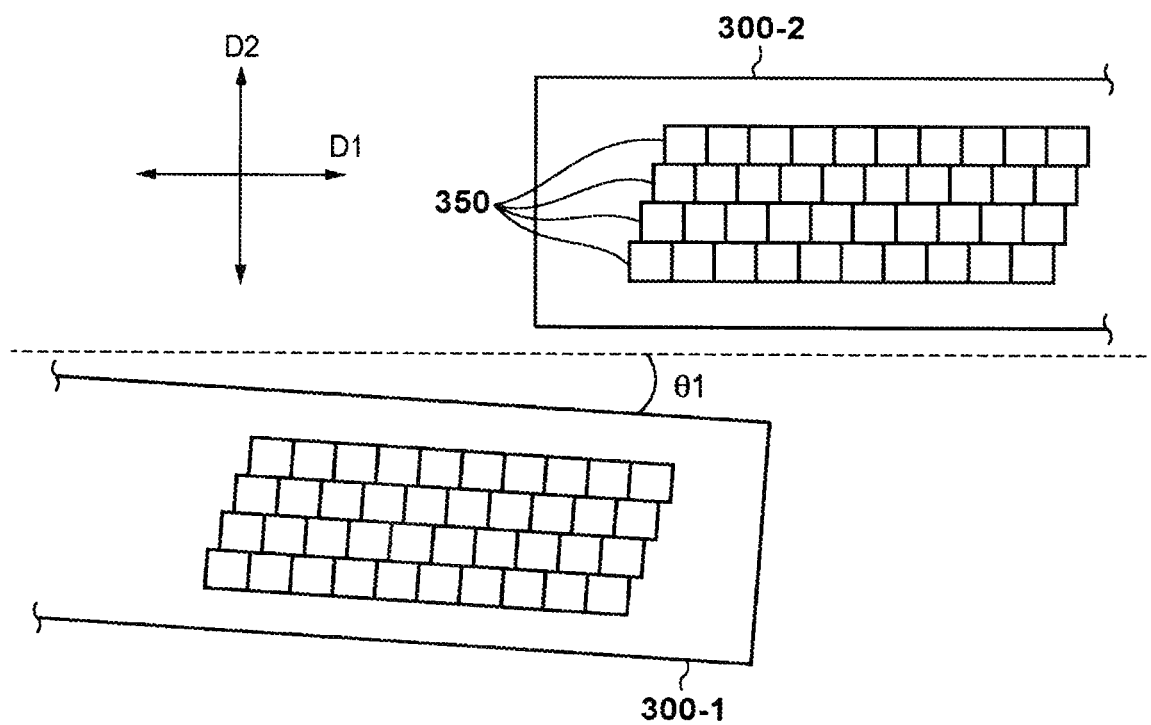
FIG. 27 is a schematic plan view illustrating an example of a shift in the arrangement of light-emitting element arrays on the printed circuit board.

Ideally, each of the light-emitting element arrays 300 is mounted on the printed circuit board 202 such that its lengthwise direction is parallel to a lengthwise direction (i.e., the first direction) of the rod lens array 203. However, in practice, a light-emitting element array 300 may be mounted on the printed circuit board 202 in a state in which its lengthwise direction is tilted with respect to the first direction. Similarly to FIG. 19, FIG. 27 illustrates an example in which two light-emitting element arrays 300-1 and 300-2 are arranged on the printed circuit board 202. In the example of FIG. 27, the light-emitting element array 300-2 is arranged without error and a lengthwise direction of the light-emitting element array 300-2 is parallel to the first direction. However, an arrangement of the light-emitting element array 300-1 is shifted due to a manufacturing error, and a lengthwise direction of the light-emitting element array 300-1 forms an angle θ1 with respect to the first direction. Meanwhile, focusing efficiency of the rod lens array may be highest on a center line of the rod lens array (illustrated by the dashed line in FIG. 27) and may become lower the more distanced the position is from the center line. Therefore, if a shift in the arrangement of the light-emitting element array 300 as illustrated occurs, a linear unevenness in the amount of light is caused within a range of one light-emitting element array 300.

Individual differences between the light-emitting element arrays 300 is also one of the causes of unevenness in the amount of light. The unevenness of the amount of light attributable to the individual differences of the light-emitting element array 300 brings about differences in a light amount distribution in chip units, similarly to unevenness in the amount of light attributable to a shift in the arrangement of a light-emitting element array 300. Therefore, in the present embodiment, it is assumed that correction of unevenness in the amount of light attributable to the individual differences of the light-emitting element arrays 300 is handled together with correction of unevenness in the amount of light attributable to a shift in the arrangement of a light-emitting element array 300.

(4) Composite Unevenness in Amount of Light Attributable to Plurality of Causes

Figure 28:
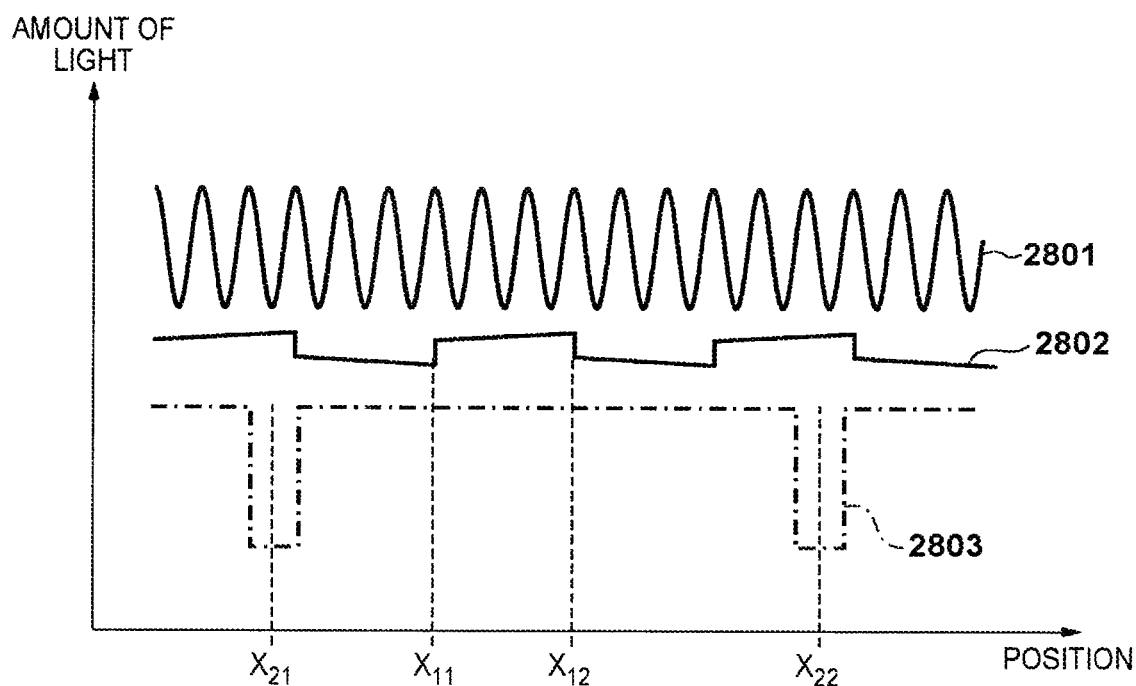
FIG. 28 is a diagram for explaining components of unevenness in the amount of light, each attributable to a respective one of three types of causes.

Unevenness of the amount of light of the entire exposure head 106 is a composite unevenness attributable to a plurality of above-exemplified causes. FIG. 28 illustrates unevenness in the amount of light attributable to each of the three types of causes, divided into cause-specific components. A light amount distribution 2801 in the drawing is an example of a component of unevenness in the amount of light attributable to the characteristic of the rod lens array. The light amount distribution 2801 periodically repeats along the first direction, increasing and decreasing in the amount of light. A light amount distribution 2802 is an example of a component of unevenness in the amount of light attributable to shifts in an arrangement of the light-emitting element arrays 300. The light amount distribution 2802 illustrates a linear change in the amount of light in a section corresponding to each of the light-emitting element arrays 300. For example, a section from a position $X_{11}$ to a position $X_{12}$ corresponds to one light-emitting element array 300, and in that section, the amount of light linearly increases as the position moves. A light amount distribution 2803 is an example of a component of unevenness in the amount of light attributable to a lens tilt of the rod lens array 203. In the example of FIG. 28, the light amount distribution 2803 exhibits a specifically low value at a position $X_{21}$ and a position $X_{22}$.

Figure 29:
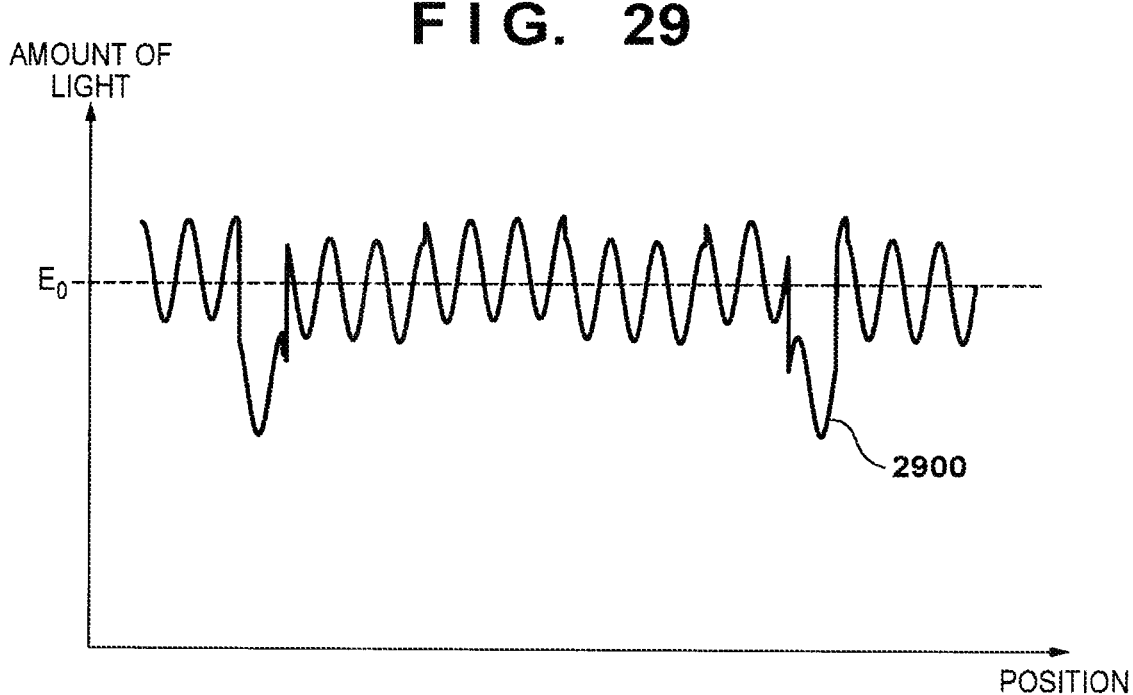
FIG. 29 is a diagram for explaining composite unevenness in the amount of light attributable to the three types of causes.

A light amount distribution 2900 of FIG. 29 indicates a composite unevenness in the amount of light attributable to these three types of causes. A light amount distribution measured for the actual exposure head 106 is complex in this way. Therefore, when attempting to generate correction data that can appropriately reproduce the light amount distribution by simple, conventional sampling of a light amount measurement result, it becomes necessary to set a very large number of data points and hold data for each of those data points. For example, if a light amount distribution of an exposure head whose image forming width is 316 mm repeatedly increases or decreases in the amount of light at approximately 0.30-mm intervals, it will be necessary to set data points at 0.15-mm intervals corresponding to at least half of the 0.30-mm interval, and therefore, the total number of data points exceeds 2100 points. Holding of the light amount measurement result data of such a large number of data points increases requirements for the amount of memory resources and leads to delays associated with a transfer of large data read out from the memory.

In contrast, in the present embodiment, fluctuations in the amount of light from a reference value (a value E0 in FIG. 29) in the light amount measurement result is decomposed into a plurality of components, and correction data is then generated in advance as a set of parameters representing features of respective components and stored in the memory. This makes it possible to reduce the total number of data points of correction data to suppress data size, allowing memory resource savings and data transfer delay reduction.

<Basic Correction Method>

A method of adjusting the amount of current to be supplied from the reference current sources 2302 of the light-emitting element arrays 300 and a method of correcting input image data so as to change local area gradation are possible as methods of correcting unevenness in the amount of light. The present embodiment incorporates both methods. Specifically, it is assumed that the image forming apparatus 1 uniformizes an average amount of light of the light-emitting element arrays 300 by the former correction method and then finely corrects the remaining unevenness in the amount of light by the latter correction method.

(1) Adjustment of Amount of Current to be Supplied to Light-Emitting Elements

The former method may be performed by rewriting a setting value related to the amount of current to be supplied in control data stored in the storage unit 2210. A characteristic of the amount of light with respect to a driving current (an I-L characteristic) of each of the light-emitting element arrays 300 can be obtained by measuring the amount of light using an image sensor whose light receiving surface is sufficiently broad as each of the light-emitting element arrays 300 of the exposure head 106 is caused to emit light while changing the driving current. Then, based on the obtained I-L characteristics, a setting value related to the amount of current to be supplied to each of the light-emitting element arrays 300 is determined so that the average amount of light is the same across all of the light-emitting element arrays 300. The determined setting value is written in the storage unit 2210 of each of the light-emitting element arrays 300. When the image forming apparatus 1 attempts to form an image thereafter, a difference in the average amounts of light between the light-emitting element arrays 300 becomes approximately zero. The reference value $E_0$ illustrated in FIG. 29 may be equal to values of the average amounts of light of the light-emitting element arrays 300 that have thus been adjusted.

(2) Change of Area Gradation in Image Data

Figure 30A:
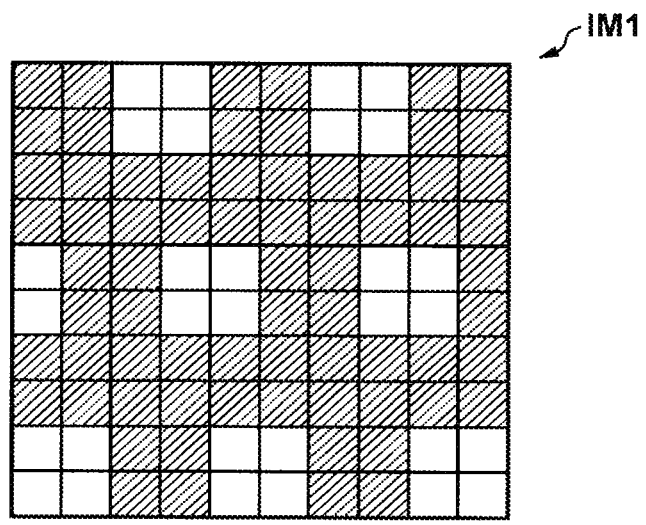
FIGS. 30A to 30C are diagrams for explaining a method of correcting unevenness in the amount of light by changing local area gradation.

In the following, the latter method of allowing fine correction of unevenness in the amount of light will be described with reference to FIGS. 30A, 30B, and 30C. FIG. 30A illustrates as an example a small image IM1, which is to be represented by uncorrected image data and is surrounding a certain reference pixel position. One box in the drawing is one pixel. Shaded pixels represent that corresponding spot regions are exposed dots, that is, corresponding M light-emitting elements emit light. White pixels represent that corresponding spot regions are non-exposure dots, that is, corresponding M light-emitting elements do not emit light. Here, it is assumed that an x-th pixel position from the left and a y-th pixel position from the top is expressed as (x, y) using the top left pixel of the small image as a reference.

Figure 30B:
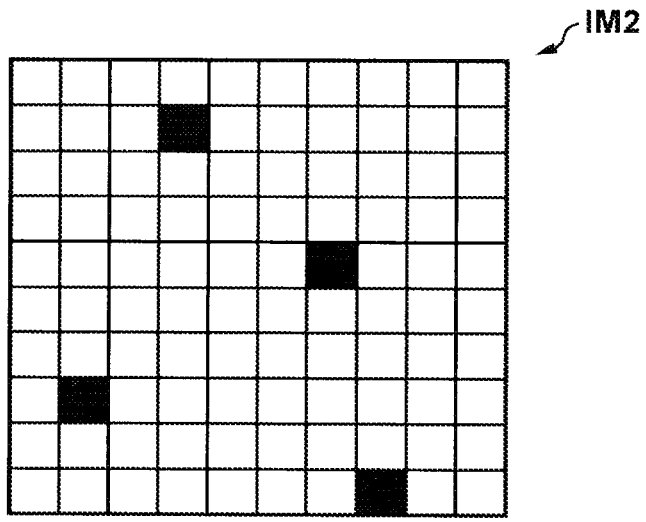
Figure 30C:
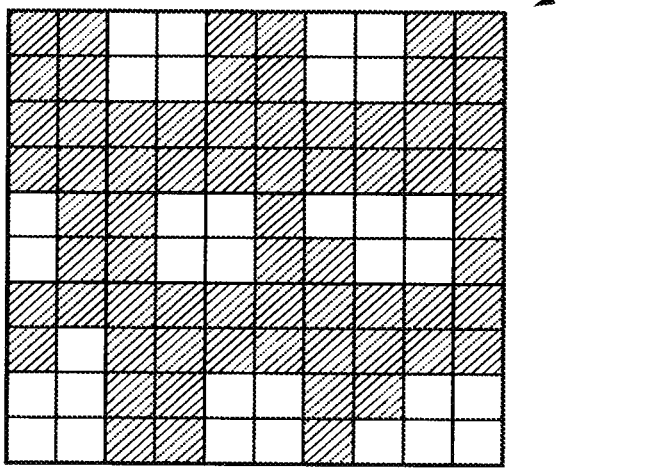

FIG. 30B illustrates a correction matrix IM2 as an example. The correction matrix IM2 is a matrix (bit map) of the same size as the small image IM1, and one box in the drawing is one element. Shaded elements represent pixels to be changed, which are to be selected in accordance with a rate of reduction (or a rate of increase) of the amount of light. There may be two types of correction matrices, one for reducing the amount of light and the other for increasing the amount of light; however, it is assumed that the correction matrix IM2 is a matrix for reducing the amount of light. As an example, in a case where the amount of light at the reference pixel position is to be reduced by 4% with respect to a maximum value, four pixels out of a total of 100 (=10×10) pixels are selected as pixels to be changed. In the example of FIG. 30B, pixels at pixel positions (4, 2), (7, 5), (2, 8), and (8, 10) are selected as the pixels to be changed. Pixel positions of the pixels to be changed may be selected in accordance with, for example, a known blue noise mask method.

If a pixel at the same position as a pixel to be changed selected in the correction matrix IM2 indicates an exposure dot in the small image IM1, the light amount correction unit 2202 changes the pixel to a non-exposure dot (that is, inverts the pixel value). FIG. 30C illustrates an example of a result of correction of the small image IM1 using the correction matrix IM2. In a small image IM3 of FIG. 30C, the pixels of the pixel positions (7, 5), (2, 8) and (8, 10), which are exposure dots in the small image IM1, are changed to non-exposure dots. In a case where the amount of light at the reference pixel position is to be increased, if a pixel at the same position as a selected pixel to be changed indicates a non-exposure dot in the small image IM1, the light amount correction unit 2202 changes that pixel to an exposure dot. While scanning reference pixel positions in input image data, the light amount correction unit 2202 repeats correction of a small image set for each reference pixel position in accordance with fluctuations in the amount of light restored based on the correction data read out from the storage unit 2210. Specifically, the light amount correction unit 2202 changes the amount of light of an area of a small image at each reference pixel position so as to absorb the fluctuations in the restored amount of light. As a result, fine correction of unevenness in the amount of light in the first direction may be realized.

(3) Increase and Decrease of Amount of Light at 1/M Resolution

In the present embodiment, as described in connection with FIG. 21, a spot corresponding to one pixel position is formed by M light-emitting elements 350 of each column of the light-emitting element array sequentially emitting light. Therefore, by changing one or more of light emission of the M light-emitting elements to no light emission, it is possible to reduce the amount of light at a 1/M resolution of a pixel pitch. Similarly, by changing one or more of no light emission of the M light-emitting elements to light emission, it is possible to increase the amount of light at a 1/M resolution of a pixel pitch. Therefore, together with the above-described change of area gradation, the light amount correction unit 2202 may increase and decrease the amount of light at such a 1/M resolution (change a light emission or no light emission state of each of the M light-emitting elements) so as to absorb fluctuations in the amount of light of the light amount distribution restored based on the correction data.

<Example of Configuration of Correction Data>

In the present embodiment, a light amount distribution of the exposure head 106 is measured at an inspection stage before shipment of a product. Then, based on a result of that measurement, correction data for allowing fluctuations in the amount of light along the first direction in the obtained light amount distribution to be later restored is generated. The generated correction data is stored in the storage unit 2210. It is assumed that the average light amount of the light-emitting element arrays 300 of the exposure head 106 is made uniform by the amount of current to be supplied being adjusted prior to the measurement of the light amount distribution. An example of a configuration of correction data to be generated based on a result of measurement of the light amount distribution will be described below.

In the present embodiment, the correction data may include the following three types of component data.
  frequency component data
  linear component data
  irregular component data
However, if a residual component obtained by excluding the frequency component from fluctuations in the amount of light is zero or negligible, linear component data and irregular component data need not be included in the correction data.

The frequency component data is data related to one or more frequency components of the light amount distribution. The frequency component data may be obtained by analyzing a spatial frequency of the light amount distribution. For example, one or more frequency components included in the light amount distribution can be extracted by performing Fourier transform on the light amount distribution. Typically, a first frequency component attributable to the characteristic of the rod lens array 203 comprising the above-described plurality of lenses 2410 is a main frequency component, and that frequency may correspond to the pitch of the lenses 2410. Alternatively, the one or more frequency components to be extracted may also include a second frequency component including a frequency corresponding to the pitch of the light-emitting elements 350. The frequency component data includes an amplitude value and a phase value of each frequency component at at least one data point. A frequency value may be derived from a known pitch; however, the frequency component data may further include the frequency value.

When a periodic unevenness in the amount of light of the rod lens array 203 changes in an ideal sine wave, those fluctuations in the amount of light can be expressed by an amplitude value and a phase value at one data point, and it is possible to reproduce the fluctuations in the amount of light at all pixel positions from the amplitude value and the phase value. However, considering discontinuity of light sources, which are in units of light-emitting element arrays, it is desirable to set at least one data point for each of the light-emitting element arrays 300 and hold an amplitude value and a phase value at those data points. Alternatively, for example, data points may be set at two points, at either end of a respective light-emitting element array 300 or at three points, at either end and the center of a respective light-emitting element array 300.

The linear component data is data related to a linear component of a section corresponding to a respective light-emitting element array 300 among residual components obtained by excluding the frequency component represented by the frequency component data from the fluctuations in the amount of light. Typically, a shift in an arrangement of each of the light-emitting element arrays 300 is a main cause of the linear component. Data points of the linear component data are set at least two points in a section corresponding to a respective light-emitting element array 300. By holding an offset value (intercept) at those data points as linear component data, it is possible to reproduce the linear component of fluctuations in the amount of light at all pixel positions in that section by linear interpolation. Alternatively, the linear component data may include an offset value and a slope of the amount of light at a data point set at one point for each of the light-emitting element arrays 300.

The irregular component data is data related to the residual component obtained by excluding the above-described frequency component and linear component from fluctuations in the amount of light. Among other things, it is assumed that the irregular component data in the present embodiment represents an irregular component caused by a lens tilt detected in the inspection of the rod lens array 203. The irregular component data includes, for example, at least one irregular component position in the first direction and an offset value corresponding to each irregular component position.

For example, assume that two or three data points of the frequency component data is set for each of the light-emitting element arrays 300, two data points of the linear component data is set for each of the light-emitting element arrays 300, and 10 data points of the irregular component data for the entire exposure head 106. In the present embodiment, 20 light-emitting element arrays 300 are mounted on the exposure head 106; therefore, the total number of data points is 90 or 110. Accordingly, in this case, when compared with the number of correction points exceeding 2100 points in a method based on conventional, simple sampling and interpolation, the number of data points is reduced to 6% or less. It is possible to commonalize data points of the frequency component data and data points of the linear component data in which case the number of data points can be further reduced.

<Restoration of Fluctuations in Amount of Light and Correction of Image Data>

When image formation is performed in the image forming apparatus 1, the light amount correction unit 2202 restores one or more frequency components of the fluctuations in the amount of light along the first direction from the frequency component data included in the correction data read out from the storage unit 2210. Further, the light amount correction unit 2202 restores the linear component of a section corresponding to a respective light-emitting element array 300 from the linear component data included in the correction data. The light amount correction unit 2202 also restores the irregular component from the irregular component data included in the correction data. The light amount correction unit 2202 calculates a coefficient for correcting the amount of light by combining the restored frequency component, linear component, and irregular component for each pixel position scanned along the first direction. The correction coefficient calculated here represents an increase or decrease rate of the amount of light for correcting the unevenness in the amount of light. The light amount correction unit 2202 corrects input image data by changing the amount of light of an area of a small image at each pixel position in accordance with the calculated correction coefficient. At this time, the light amount correction unit 2202 may change the amount of light of an area at high resolution by changing the light emission or no light emission state of each of the M light-emitting elements 350 corresponding to one pixel. Then, the light amount correction unit 2202 outputs the corrected image data to the conversion unit 2203.

<Manufacturing of Exposure Apparatus>

Figure 31:
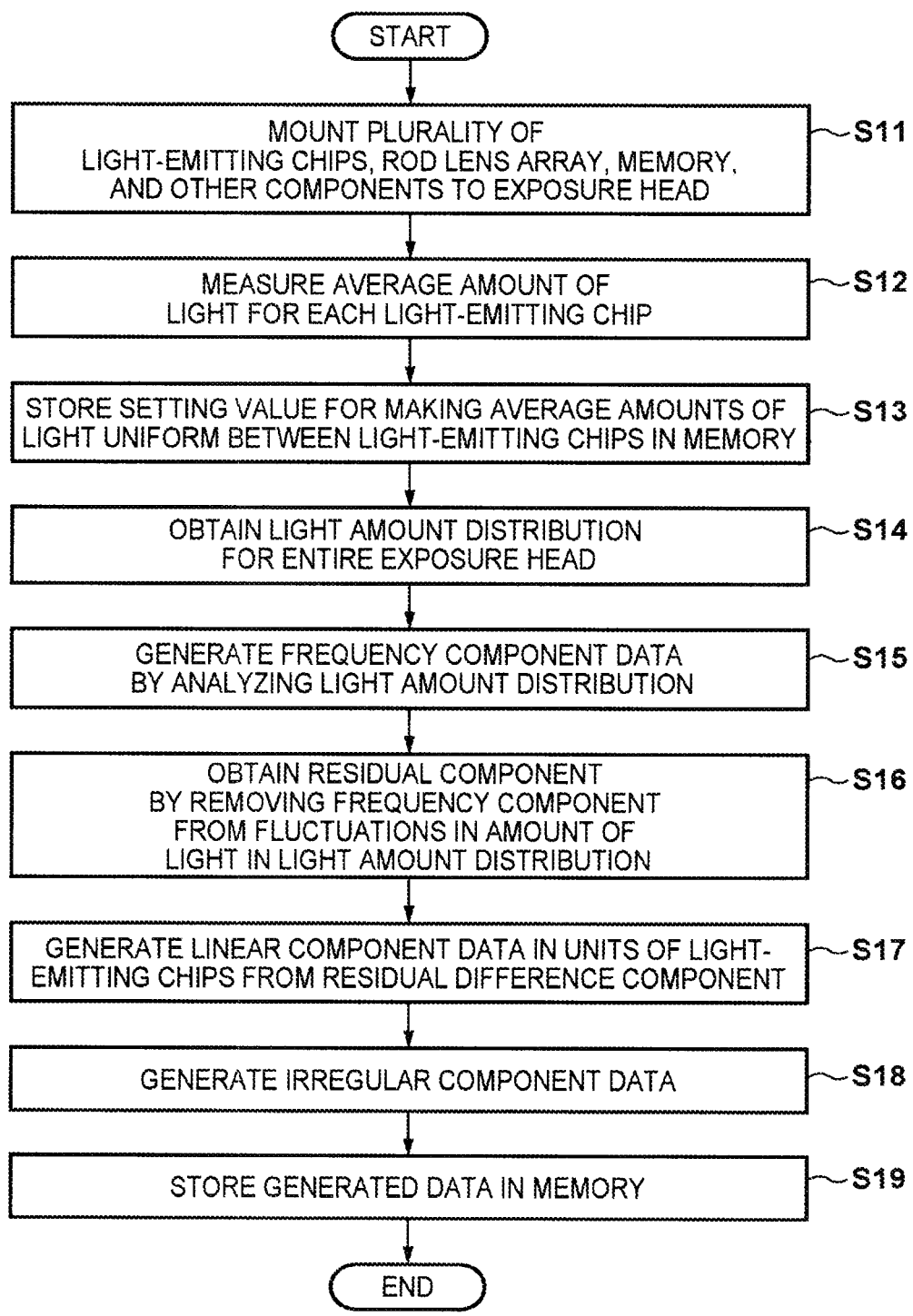
FIG. 31 is a flowchart for explaining an example of processing for manufacturing an exposure apparatus according to an embodiment.

FIG. 31 is a flowchart for explaining an example of processing for manufacturing the exposure apparatus according to the present embodiment.

First, in step S11, which is an assembly process performed at the factory, various circuit elements including a plurality of light-emitting element arrays 300 are mounted on the printed circuit board 202 of the exposure head 106. The printed circuit board 202 and the rod lens array 203 are also mounted to the housing 204. A storage unit (memory) 810 may be mounted to the printed circuit board 202 in a form in which it is mounted to the light-emitting element arrays 300 or may be separately mounted to the printed circuit board 202. After such assembly of the exposure head 106, a spot size in an image forming plane of the rod lens array 203 may be measured, focus may be adjusted, and a mounting position of the rod lens array 203 may be adjusted.

Next, in step S12, the amount of light of each of the light-emitting element arrays 300 of the exposure head 106 is measured, and an average amount of light for each of the light-emitting element arrays 300 is calculated. Next, in step S13, a setting value related to an amount of current to be supplied for making the average amounts of light uniform between the light-emitting element arrays 300 is determined, and the determined setting value is stored in the storage unit 2210 of each of the light-emitting element arrays 300.

Next, in step S14, a light amount distribution of the entire exposure head 106 is obtained by measuring the amount of light from the exposure head 106 along the first direction, which is parallel to the axial direction D1 of the photosensitive drum 102, in a state in which the average amounts of light between the light-emitting element arrays 300 are uniform. For example, the light amount distribution may be obtained by causing an image sensor provided with a slit having a certain opening width to scan in the lengthwise direction of the exposure head 106. Alternatively, the light amount distribution may be obtained by causing the light-emitting elements 350 of the light-emitting element arrays 300 to sequentially emit light while keeping the image sensor fixed. It is desirable that, here, the amount of light is measured at a spatial resolution of, for example, at least $1/10$ of the pitch $P_1$ of the lenses 2410.

Next, in step S15, frequency component data related to one or more frequency components of the light amount distribution is generated by analyzing (e.g., by Fourier transform) the light amount distribution obtained as a result of measuring the amount of light. The frequency component data generated here may include an amplitude value and a phase value at at least one data point of each of the one or more significant frequency components. Next, in step S16, a residual component is obtained by removing the frequency component reconstructed (e.g., by inverse Fourier transform) from the frequency component data from the fluctuations in the amount of light indicated by the light amount distribution.

Next, in step S17, linear component data in units of light-emitting element arrays is generated from the residual component of fluctuations in the amount of light. The linear component data generated here may include offset values at at least two data points set in a section corresponding to a respective light-emitting element array 300. Also, in step S18, irregular component data related to an irregular component measured for each of the plurality of lenses 2410 of the rod lens array 203 is generated. If a lens tilt is not detected in the rod lens array 203, step S18 may be omitted.

Next, in step S19, correction data, which may include the frequency component data generated in step S15, the linear component data generated in step S17, and the irregular component data generated in step S18, is stored in the storage unit 2210 of the respective light-emitting element array 300.

Although not illustrated in FIG. 31, the printed circuit board 202 of the exposure head 106 is connected to the image controller 2200 via a plurality of signal lines. The image forming apparatus 1 may be manufactured by incorporating the exposure apparatus thus manufactured into the image forming units 101, which may include the photosensitive drum 102 and other components.

<Summary>

Various embodiments have been described in detail with reference to FIGS. 1 to 31. According to the above-described embodiments, a light amount distribution of an exposure head, which includes a rod lens array, is measured; frequency component data related to a frequency component of the measured light amount distribution is generated by analyzing the measured light amount distribution; and correction data, which includes the generated frequency component data, is stored in a memory. Then, image data for driving light-emitting element arrays of the exposure head is corrected in accordance with fluctuations in the amount of light amount restored based on the frequency component data in the correction data read out from the memory. Accordingly, it is possible to express fluctuations in the amount of light as a set of parameters in a relatively small number of data points when the light amount distribution of the exposure head depicts a path in which the amount of light repeatedly increases or decreases in a direction in which the lens in the rod lens array are arranged. Therefore, it is possible to reduce the memory resources required for storing the correction data, thereby allowing reduction of the manufacturing cost of the apparatus. Further, since a delay of data transfer due to readout of the correction data is shortened, the time required to start the apparatus or execute a job can be shortened.

In the above-described embodiments, the above frequency component may include a frequency component corresponding to a pitch of an arrangement of a plurality of lenses in the rod lens array. By including an amplitude value and a phase value of the frequency component at at least one data point in the above correction data, it is possible to satisfactorily express periodic unevenness in the amount of light caused by a characteristic of the rod lens array without requiring large data size.

In the above-described embodiments, the above frequency component may include a frequency component corresponding to a pitch of an arrangement of a plurality of light-emitting element arrays in the exposure head. By including in the above correction data an amplitude value and a phase value of the frequency component at a data point set in a section corresponding to a respective light-emitting element array, it is possible to satisfactorily express periodic unevenness in the amount of light that may be influenced by individual differences between the individual light-emitting element arrays.

In the above-described embodiments, the above correction data may further include linear component data related to a linear component measured for each of the light-emitting element arrays. By including in the above correction data an offset value of this linear component at a data point set in a section corresponding to a respective light-emitting element array, it is possible to satisfactorily express a partially linear unevenness in the amount of light that may be caused by a shift in the arrangement of the individual light-emitting element arrays. Therefore, also considering a residual component obtained by excluding the frequency component from the fluctuations in the light amount in the light amount distribution of the exposure head, it is possible to accurately correct unevenness in the amount of light.

In the above-described embodiments, the above correction data may further include irregular component data related to an irregular component measured for each of the above plurality of lenses. By expressing, for example, unevenness caused by a lens tilt, which may occur accidentally in the process of manufacturing the rod lens array, as irregular component data for the residual component of unevenness in the amount of light, which lacks regularity but does not occur frequently, it is possible to further improve the accuracy of correction of unevenness in the amount of light.

Further, in the above-described embodiments, image data can be corrected by changing the amount of light of an area of a small image set at each pixel position of the image data so as to absorb the fluctuations in the amount of light in the light amount distribution. By thus correcting unevenness in the amount of light in a digital region at a stage before data is distributed to the plurality of light-emitting element arrays, it is possible to prevent the configuration of the circuit for driving the light-emitting element arrays from becoming complicated, and thereby reduce the manufacturing cost. Further, by adjusting the amount of light of an area by changing a light emission or no light emission state of each of the M light-emitting elements involved in forming one image forming spot, it is possible to correct unevenness in the amount of light at high resolution, thereby allowing improvement in image quality.

In the above-described embodiments, specific numerical values have been used for the sake of descriptive convenience; however, these specific numerical values are only one example, and the present invention is not limited to the specific numerical values that have been used in the embodiments. Specifically, the number of light-emitting element arrays to be provided on one printed circuit board is not limited to 20, and there can be an arbitrary number of one or more light-emitting element arrays. The size of each of the light-emitting element arrays 300 is not limited to four rows and 748 columns and may be any other size. The circumferential and axial pitches of the light-emitting elements are not limited to approximately 21.16 μm and approximately 5 μm and may be any other value.

<Other Embodiments>

The above-described embodiments can be realized in a form of processing in which a program for realizing one or more functions is supplied to a system or apparatus via a network or storage medium and one or more processors in a computer of the system or apparatus reads out and executes that program. The above-described embodiments can also be realized by a circuit (e.g., ASIC) for realizing one or more functions.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028384 filed Feb. 25, 2022, Japanese Patent Application No. 2022-138340 filed Aug. 31, 2022, and Japanese Patent Application No. 2023-011220 filed Jan. 27, 2023 which are hereby incorporated by reference herein in their entirety.

What is claimed is:

1. An exposure apparatus comprising:
   an exposure head including a plurality of light-emitting elements arranged in a direction intersecting a direction of rotation of a photosensitive body to be rotationally driven, and a rod lens array configured to form an image of light outputted from each of the plurality of light-emitting elements based on image data, on the photosensitive body, and configured to form a latent image on the photosensitive body;
   a memory configured to store correction data for correcting a streak image, the correction data including characteristic information indicating an image forming characteristic of the rod lens array; and
   at least one processor configured to correct the image data based on the correction data read out from the memory,
   wherein the at least one processor is further configured to reduce streak-like density unevenness occurring in the latent image by correcting the image data for driving the plurality of light-emitting elements based on the characteristic information read out from the memory,
   wherein the at least one processor is further configured to (1) identify a pixel to be corrected in the image data based on characteristic information and (2) correct pixel data of the identified pixel based on the characteristic information,
   wherein the characteristic information includes (1) positional information indicating a position of the pixel to be corrected among a plurality of pixels constituting the image data, and (2) a correction level to be applied to the pixel data of the pixel to be corrected,
   wherein the positional information includes information indicating a position of a pixel that is among the plurality of pixels constituting the image data and is first among a series of pixels to be corrected, and
   wherein the characteristic information includes the correction level for each of the series of pixels to be corrected.

2. The exposure apparatus according to claim 1, wherein the characteristic information includes one correction level for each pixel among the series of pixels to be corrected.

3. The exposure apparatus according to claim 1, wherein the characteristic information includes one common correction level for N (N is an integer of 2 or more) pixels of the series of pixels to be corrected.

4. The exposure apparatus according to claim 1, wherein the at least one processor is further configured to:
   compute a correction value for each pixel based on the correction level; and
   execute correction processing on the image data for each pixel based on the correction value obtained for each pixel.

5. The exposure apparatus according to claim 4, wherein the at least one processor is further configured to correct a pixel value of a pixel of interest by adding the correction value obtained for that pixel of interest to the pixel value of that pixel of interest.

6. The exposure apparatus according to claim 4, wherein the at least one processor is further configured to obtain a corrected pixel value for a pixel of interest by referencing a table based on a pixel value of that pixel of interest and the corrected value obtained for that pixel of interest.

7. The exposure apparatus according to claim 4, wherein the at least one processor is further configured to, in a case where a first correction value obtained for a preceding pixel positioned precedingly to a pixel of interest in a main scanning direction, a second correction value obtained for that pixel of interest, and a third correction value obtained for a subsequent pixel positioned subsequently to that pixel of interest in the main scanning direction are in a predetermined combination, apply the second correction value to the pixel value of the pixel of interest.

8. The exposure apparatus according to claim 4, wherein the at least one processor is further configured to:
   compute a first product by multiplying a first correction value obtained for a preceding pixel positioned precedingly to a pixel of interest in a main scanning direction by a first filter coefficient;
   compute a second product by multiplying a second correction value obtained for that pixel of interest by a second filter coefficient;
   compute a third product by multiplying a third correction value obtained for a subsequent pixel positioned subsequently to that pixel of interest in the main scanning direction by a third filter coefficient;
   obtain a total correction value by adding the first product, the second product, and the third product; and
   correct the pixel value of the pixel of interest using the total correction value.

9. The exposure apparatus according to claim 4, wherein the at least one processor is further configured to:
   count a main scanning position based on a clock signal;
   determine whether the counted main scanning position and the position of the pixel to be corrected coincide; and
   when a predetermined signal indicating that the counted main scanning position and the position of the pixel to be corrected coincide is outputted, start computation of the correction value.

10. The exposure apparatus according to claim 1, wherein the memory is provided in the exposure head.

11. An exposure apparatus comprising:
    an exposure head including a plurality of light-emitting elements arranged in a direction intersecting a direction of rotation of a photosensitive body to be rotationally driven, and a rod lens array configured to form an image of light outputted from each of the plurality of light-emitting elements based on image data, on the photosensitive body, and configured to form a latent image on the photosensitive body;
    a memory configured to store correction data for correcting a streak image; and
    at least one processor configured to correct the image data based on the correction data read out from the memory,
    wherein the exposure head includes a plurality of light-emitting chips arranged regularly in a first direction, which is parallel to an axial direction of the photosensitive body,
    wherein each of the plurality of light-emitting chips includes the plurality of light-emitting elements arranged regularly at least in the first direction,
    wherein the correction data includes frequency component data related to one or more frequency components of a light amount distribution obtained by analyzing a distribution of an amount of light measured along the first direction, and wherein the at least one processor is further configured to correct the image data in accordance with fluctuations in an amount of light in the light amount distribution restored based on the frequency component data included in the correction data.

12. The exposure apparatus according to claim 11, wherein the frequency component data includes an amplitude value and a phase value of each of the one or more frequency components at at least one data point.

13. The exposure apparatus according to claim 12, wherein the rod lens array includes a plurality of lenses arranged regularly in the first direction,
wherein the plurality of lenses of the rod lens array are arranged at a first pitch in the first direction, and
wherein the one or more frequency components include a frequency component corresponding to the first pitch.

14. The exposure apparatus according to claim 13, wherein the plurality of light-emitting elements of each of the plurality of light-emitting chips are arranged at a second pitch in the first direction,
wherein the one or more frequency components further includes a frequency component corresponding to the second pitch, and
wherein the at least one data point includes a data point set for a section corresponding to each of the plurality of light-emitting chips.

15. The exposure apparatus according to claim 11, wherein the correction data further includes linear component data related to a linear component measured for each of the plurality of light-emitting chips, and
wherein the at least one processor is further configured to restore the fluctuations in the amount of light in the light amount distribution based on the linear component data included in the correction data.

16. The exposure apparatus according to claim 15, wherein the linear component data includes an offset value in at least two data points set to be a section corresponding to each of the plurality of light-emitting chips.

17. The exposure apparatus according to claim 11, wherein the at least one processor is further configured to correct the image data by changing an amount of light of an area of a small image set as a respective pixel position so as to absorb the fluctuations in the amount of light in the light amount distribution.

* * * * *